United States Patent
Mulye

(10) Patent No.: US 11,125,144 B2
(45) Date of Patent: Sep. 21, 2021

(54) INTERNALLY COOLED INTERNAL COMBUSTION ENGINE AND METHOD THEREOF

(71) Applicant: NOSTRUM ENERGY PTE. LTD, Singapore (SG)

(72) Inventor: Nirmal Mulye, Kendall Park, NJ (US)

(73) Assignee: Nostrum Energy PTE. LTD, Singapore (SG)

( * ) Notice: Subject to any disclaimer, the term of this patent is extended or adjusted under 35 U.S.C. 154(b) by 0 days.

(21) Appl. No.: 15/472,015

(22) Filed: Mar. 28, 2017

(65) Prior Publication Data

US 2017/0198629 A1  Jul. 13, 2017

Related U.S. Application Data

(63) Continuation of application No. 14/761,369, filed as application No. PCT/US2014/012035 on Jan. 17, 2014, now abandoned.

(Continued)

(51) Int. Cl.
*F01P 9/02* (2006.01)
*F01P 3/20* (2006.01)

(Continued)

(52) U.S. Cl.
CPC ...... *F01P 9/02* (2013.01); *F01P 3/20* (2013.01); *F01P 11/00* (2013.01); *F02B 1/02* (2013.01);

(Continued)

(58) Field of Classification Search
CPC ...... F01P 9/02; F01P 3/20; F01P 11/00; F01P 2003/001; F02M 26/22; F02M 26/23;

(Continued)

(56) References Cited

U.S. PATENT DOCUMENTS 4,120,268 A    10/1978  Bastenhof
4,131,086 A *  12/1978  Noguchi ............... C01B 3/38
                                                        123/3

(Continued)

FOREIGN PATENT DOCUMENTS

CN    1376857 A    10/2002
CN    1444691 A    9/2003

(Continued)

OTHER PUBLICATIONS

Notification of the First Office Action and Search Report ssued in Chinese Patent Application No. 2014800164090 dated Jan. 26, 2017.

(Continued)

*Primary Examiner* — Grant Moubry
(74) *Attorney, Agent, or Firm* — Jonathan D. Ball; Tanzina Chowdhury

(57) ABSTRACT

An internal combustion engine is equipped with a water injector for cooling the internal combustion engine by a spray of atomized water into the intake track or combustion chamber prior to ignition. The atomized water spray may be in the intake manifold or directly in the cylinder. The water is injected at a volume of between a ratio of about 95% fuel to about 5% water and about 50% fuel and about 50% water. The temperature of the internal combustion engine is maintained at between about 95° C. and about 200° C. during operation.

6 Claims, 13 Drawing Sheets

Related U.S. Application Data

(60) Provisional application No. 61/753,719, filed on Jan. 17, 2013.

(51) Int. Cl.
| | | |
|---|---|---|
| *F01P 11/00* | (2006.01) | |
| *F02M 26/22* | (2016.01) | |
| *F02M 26/23* | (2016.01) | |
| *F02M 25/03* | (2006.01) | |
| *F02B 47/02* | (2006.01) | |
| *F02M 31/20* | (2006.01) | |
| *F02M 25/028* | (2006.01) | |
| *F02B 1/02* | (2006.01) | |
| *F02D 19/12* | (2006.01) | |
| *F02D 41/00* | (2006.01) | |
| *F02D 41/14* | (2006.01) | |
| *F02M 25/022* | (2006.01) | |
| *F01P 3/00* | (2006.01) | |

(52) U.S. Cl.
CPC ............ *F02B 47/02* (2013.01); *F02D 19/12* (2013.01); *F02D 41/0025* (2013.01); *F02D 41/1446* (2013.01); *F02M 25/028* (2013.01); *F02M 25/0227* (2013.01); *F02M 25/03* (2013.01); *F02M 26/22* (2016.02); *F02M 26/23* (2016.02); *F02M 31/20* (2013.01); *F01P 2003/001* (2013.01); *F02D 41/0072* (2013.01); *F02D 2200/021* (2013.01)

(58) Field of Classification Search
CPC ...... F02M 26/28; F02M 31/20; F02M 26/022; F02M 25/0221; F02M 25/025; F02M 25/028; F02M 25/03; F02B 47/02; Y02T 10/121
USPC ....... 123/25 C, 25 Q, 568.11, 568.12, 41.02, 123/41.48, 41.57
See application file for complete search history.

(56) References Cited

U.S. PATENT DOCUMENTS

| | | | | |
|---|---|---|---|---|
| 5,131,229 | A | | 7/1992 | Kriegler et al. |
| 5,694,908 | A | | 12/1997 | Hsu |
| 5,718,194 | A | | 2/1998 | Binion |
| 5,941,204 | A | * | 8/1999 | Randolph ............... F02N 19/10 123/142.5 E |
| 6,112,705 | A | | 9/2000 | Nakayama et al. |
| 6,435,166 | B1 | * | 8/2002 | Sato ........................ F02D 21/08 123/568.12 |
| 6,598,584 | B2 | * | 7/2003 | Beck ........................ F02B 1/12 123/299 |
| 6,637,381 | B2 | * | 10/2003 | Stanglmaier ............ C10L 1/328 123/25 F |
| 6,637,382 | B1 | * | 10/2003 | Brehob .................... F02B 47/02 123/25 J |
| 6,986,252 | B2 | * | 1/2006 | Hedman ................. F01B 17/04 123/25 C |
| 7,730,872 | B2 | * | 6/2010 | Leone ...................... F01N 11/00 123/25 C |
| 8,291,872 | B2 | * | 10/2012 | Szybist ................... F02B 47/02 123/25 C |
| 8,602,007 | B2 | * | 12/2013 | Wu ...................... F02B 29/0412 123/568.12 |
| 8,689,554 | B2 | * | 4/2014 | Espinosa ................ F01K 21/04 60/605.2 |
| 8,935,996 | B2 | * | 1/2015 | Mulye ..................... F02B 47/02 123/25 A |
| 2002/0050251 | A1 | | 5/2002 | Takahashi et al. |
| 2002/0083906 | A1 | * | 7/2002 | Kato ........................ F01P 3/16 123/41.82 R |
| 2002/0179037 | A1 | * | 12/2002 | Nagel ...................... F01B 9/06 123/258 |
| 2011/0108000 | A1 | * | 5/2011 | Williams ............... F02M 25/03 123/25 C |
| 2012/0067332 | A1 | * | 3/2012 | Wu ...................... F02B 29/0412 123/568.12 |
| 2012/0111003 | A1 | | 5/2012 | Kasuya et al. |
| 2012/0260886 | A1 | | 10/2012 | Mulye |
| 2013/0297183 | A1 | | 11/2013 | Dieler et al. |

FOREIGN PATENT DOCUMENTS

| | | |
|---|---|---|
| CN | 1643244 A | 7/2005 |
| DE | 301286 | 4/1920 |
| DE | 199 02 349 A1 | 7/1999 |
| DE | 10 2011 015 628 A1 | 4/2012 |
| EP | 0 742 363 A1 | 11/1996 |
| EP | 1 050 569 A1 | 11/2000 |
| FR | 2 772 426 | 6/1999 |
| GB | 1 487 782 | 10/1977 |
| JP | A 03-070850 | 3/1991 |
| JP | 10-54221 A2 | 2/1998 |
| JP | H11-82182 A | 3/1999 |
| JP | 11-287159 A2 | 10/1999 |
| JP | A 11-270373 | 10/1999 |
| JP | A2013007305 | 6/2002 |
| JP | A2010077964 | 4/2010 |
| JP | A2002161747 | 1/2013 |
| WO | 2010/002737 A1 | 1/2010 |
| WO | 2012045452 A2 | 4/2012 |
| WO | 2012142135 A1 | 10/2012 |

OTHER PUBLICATIONS

Supplementary European Search Report issued in European Application No. 14 74 0690 dated Oct. 19, 2016.
International Search Report issued in International Application No. PCT/US2014/012035 dated May 19, 2014.
Japanese Office Action dated Sep. 26, 2017 issued in corresponding Japanese Patent Appln. No. 2015-553848 (English translation).
Office Action dated Feb. 6, 2018 received from the Japanese Patent Office from corresponding Japanese Patent Application No. 2015-553848.
European Search Report issued in corresponding European Patent Application No. EP 17 17 3009 dated Apr. 26, 2018.
Office Action dated May 28, 2019 received from the Japanese Patent Office from the corresponding Japanese Patent Application No. 2018-108998, with English language translation.
English Translation of Japanese Patent No. JPH11-82182.
Office Action dated Oct. 8, 2019 received from the Japanese Patent Office from corresponding Japanese Patent Application No. 2015-553848.

\* cited by examiner

INTERNALLY COOLED INTERNAL COMBUSTION ENGINE AND METHOD THEREOF

CROSS-REFERENCE TO RELATED APPLICATIONS

The instant application claims is a continuation application of U.S. patent application Ser. No. 14/761,369 filed Jul. 16, 2015 which, in turn, claims priority from U.S. Provisional Patent Application No. 61/753,719 filed Jan. 17, 2013, the contents of which is incorporated herein by reference. Additionally, the instant application claims priority from PCT Application No. PCT/US2014/012035 filed on Jan. 17, 2014, the contents of which are incorporated herein by reference and priority from PCT Application No. PCT/IB2013/002593 filed on Nov. 20, 2013.

FIELD OF THE INVENTION

The present invention relates generally to internal combustion engines. More specifically, the present invention relates to an internal combustion engines with exhaust gases recirculation.

This invention pertains to internal combustion engines with at least one reciprocating piston that operate with directly cooled exhaust gases recirculation (EGR). The principles set forth herein can be used in both spark-ignition (SI) engines typically operating on gasoline (petrol), natural gas, or ethanol blends, or in compression-ignition (CI) engines typically operating on diesel, biodiesel, JP-8 or other jet fuel variants, kerosene, or heavy oil. This invention is applicable to both naturally aspirated and forced aspiration internal combustion engines with exhaust gases recirculation. This invention is applicable in direct fuel injection and port fuel injected engines.

BACKGROUND

The use of EGR in internal combustion engines is a well understood and widely applied in commercial products. Exhaust gases recirculated to the combustion chamber of a gasoline engine displace the amount of combustible charge in the cylinder, and in a diesel engine the exhaust gases displace excess oxygen in the pre-combustion mixture. The displacement of combustible charge results in a lower combustion temperature and is effective in reducing the formation of NOx which forms primarily when a mixture of nitrogen and oxygen is subject to temperatures above 1371° C. (1644° K). Recirculated exhaust gases displace intake air and decrease the charge density through heating. These combined effects contribute to reducing pumping losses resulting in an increase in engine efficiency, albeit at reduced power. EGR is therefore an effective method for reducing Nitrogen oxides ("NOx") emissions in both SI and CI engines, as well as improving Otto-cycle engine efficiency.

The reintroduction of exhaust gases back into the combustion chamber reduces peak combustion temperatures. This reduction in temperature is largely because the returned exhaust gases do not participate in the combustion and thus delivers no combustion energy. The exhaust gases provide additional thermal mass and allow combustion energy to distribute to a higher overall thermal mass, where the product of mass and heat capacity (m*Cv) is higher with EGR than without EGR. The temperature reduction provided by EGR recirculation reduces combustion temperature and is therefore effective in controlling and reducing NOx formation. EGR allows for higher manifold pressures at any given load, resulting in a reduction in charge cycle work, lowering fuel consumption.

There are two methods of re-routing exhaust gases back into the combustion chamber. The first method is internal exhaust gases recirculation (i-EGR) via valve phasing or valve overlap. Valve overlap is the condition in which the intake valve is opened early to allow exhaust gases to enter the intake track during the exhaust stroke or the condition in which the exhaust valve is kept open late during the intake stroke to allow exhaust gases to return to the combustion chamber. This is commonly achieved by utilizing variable valve timing systems to vary the camshaft phasing to adjust the valve event according to the engine operating point to optimize the EGR benefits. This is illustrated in FIG. 1, showing a schematic of a prior art engine showing the flow of exhaust gases with internal EGR via intake valve 11, which is opened early at the end of the exhaust stroke to allow exhaust gases 14 from the combustion chamber 15 to enter the intake track 16 during the piston 12 exhaust stroke and mix with intake charge air 13 entering the combustion chamber 15 during the piston 12 intake stroke.

Referring to FIG. 2, a schematic of a prior art engine shows the flow of exhaust gases with internal EGR via exhaust valve 21. The exhaust valve 21 remains open late after the piston 22 exhaust stroke, and during the intake stroke of the piston 22 to allow exhaust gases 23 in the exhaust track 26 to return 24 to the combustion chamber 25.

The second method of exhaust gas recirculation is via an exhaust gas loop external to the combustion chamber which may or may not comprise corresponding controlled EGR valves (e-EGR). The EGR valve is activated electronically depending on the engine operating point to feed the appropriate amount of exhaust gases back into the fresh intake air-fuel mixture. FIG. 3 shows a prior art schematic of an engine in which EGR is provided via an external loop with an external EGR cooler 34. The exhaust gas 31 is expelled from the combustion chamber 33 during the piston 32 exhaust stroke. The exhaust gas 31 is channeled from the exhaust track 37, by means of tubes, pipes, channels, and other means to an external heat transfer device 34, in the form of a heat exchanger or like embodiment to cool the exhaust gases. The cooled exhaust gases 35 are channeled from the heat transfer device 34 into the intake air flow 36 prior to or within the intake air track 38. As previously described, the additional EGR gas increases the thermal mass of the mixed intake charge.

Both solutions have drawbacks. With e-EGR, a time delay is introduced between an EGR percentage request by the engine management system and the exhaust gases arrival at the engine inlet. This delay causes control issues which lead to lower engine efficiency. With i-EGR control is improved, but very high gas temperatures are re-circulated, leading to a loss of volumetric efficiency and a limitation on how much EGR can be achieved prior to knock onset. Industry and academic work has been performed on cooled EGR utilizing an external heat exchanger to cool the exhaust gases and all focus has been on external EGR loop cooling because it has been the most effective and feasible method to implement cooled EGR.

The emissions reduction potential of EGR systems can be improved further through cooled EGR systems. Cooled EGR is widely utilized in compression ignition engines, where the EGR system is integrated into the high pressure exhaust and charge loop of a turbocharged diesel engine. The exhaust gases are recirculated from the main exhaust flow between the cylinder and the exhaust gases turbine. The exhaust gases pass through an intercooler or heat exchanger, which utilizes a secondary external cooling source, to transfer heat from the exhaust gases though a solid medium in the form of a heat exchanger. The cooled exhaust gases are then introduced into the intake air loop of the engine, either in the high pressure loop between the compressor and the cylinder or in the low pressure loop upstream of the compressor.

A cooled external EGR system may use a valve to regulate the volume of re-circulated exhaust gases controlled by the engine management system, the exhaust pipes, the exhaust gas cooler and the intake pipes. These systems utilize an external cooling agent through a form of heat exchanger in order to extract heat from the hot exhaust gases prior to introducing the exhaust gases into the cylinder chamber. Cooled EGR systems expose the exhaust gas cooler to an extreme temperature up to about 450° C. in passenger cars and about 700° C. in commercial vehicle applications.

SUMMARY OF THE INVENTION

An embodiment of the present invention is an internal combustion engine including: at least one cylinder. Each cylinder has a combustion chamber, a piston, an air intake valve, and an exhaust valve. An air intake track is provided in communication with each air intake valve, and an exhaust track is provided in communication with each exhaust valve. A fuel handling system, with at least one fuel injector, is configured to inject fuel into the combustion chamber or intake track. An ignition system is configured to ignite the fuel in the combustion chamber at an end portion of a compression stroke of the piston. Additionally, the present invention includes a primary cooling system for maintaining the internal combustion engine within a predetermined operating temperature range. The primary cooling system includes a water reservoir in fluid communication with an injector provided to cool the internal combustion engine. The injector is arranged to inject a controlled amount of liquid water into the combustion chamber or intake track.

DETAILED DESCRIPTION

Figure 1:
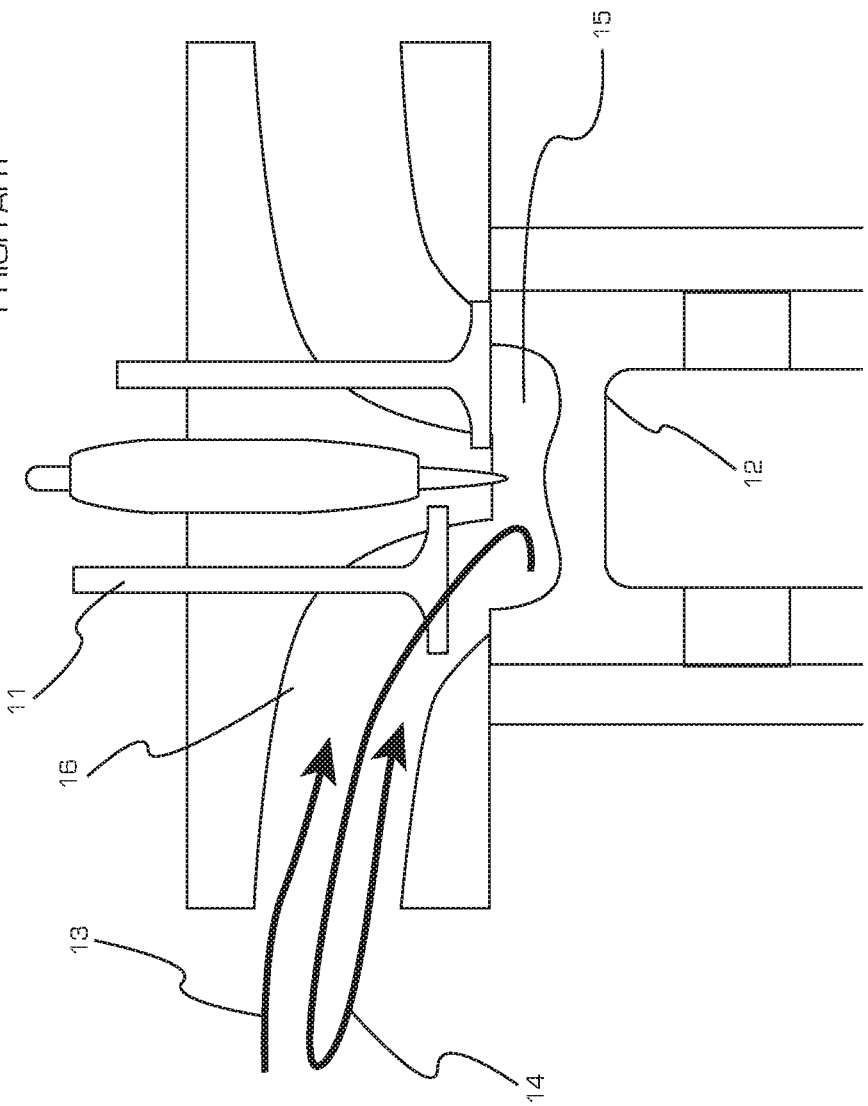
FIG. 1 is a schematic of a section of a prior art engine showing the flow of exhaust gases with internal EGR via intake valve.
Figure 2:
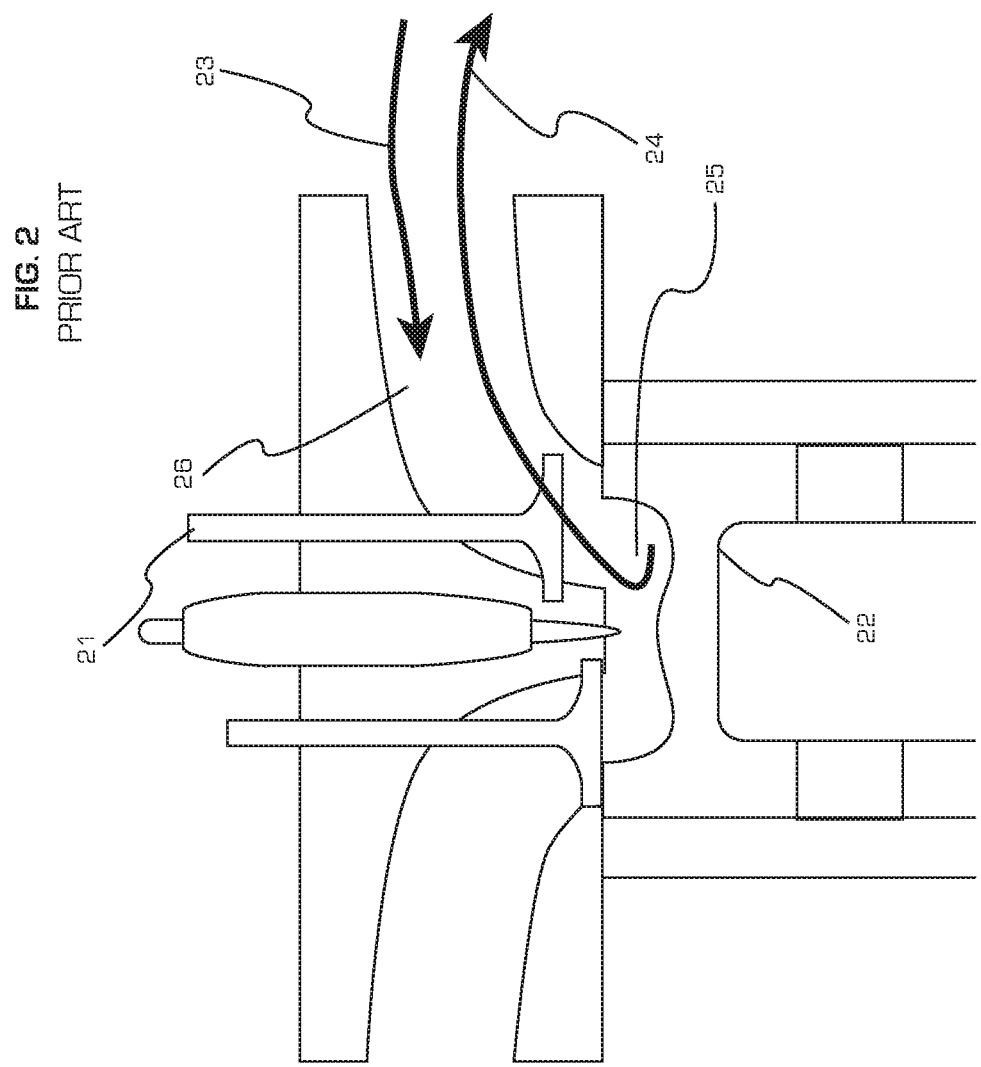
FIG. 2 is a schematic of a section of a prior art engine showing the flow of exhaust gases with internal EGR via exhaust valve.
Figure 3:
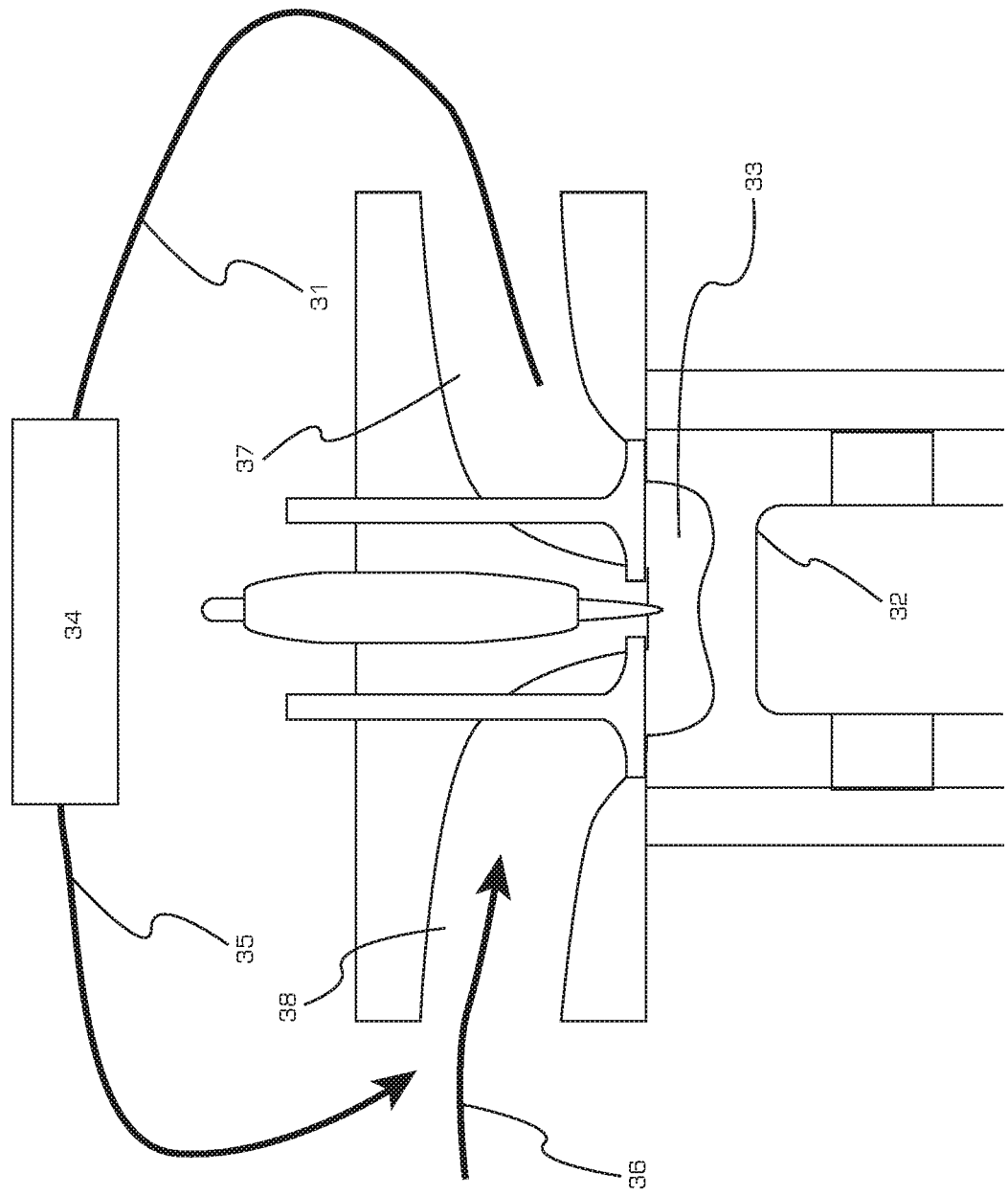
FIG. 3 is a schematic of a section of a prior art engine showing the flow of exhaust gases with external EGR via an external loop with EGR cooler.

The present invention provides a four-stroke spark ignition or compression ignition (diesel) internal combustion engine that operates at substantially higher thermodynamic efficiency than conventional engines through the use of lean fuel mixtures, high compression ratios, higher operating temperatures, exhaust gases recirculation (EGR), and water injection in the EGR path, intake manifold or cylinder.

In the context of the present invention, the term "intake track" refers to any part of the fresh air path between the environment, i.e., the air intake, and the combustion chamber. Thus, the intake track includes the air intake, air inlet, any fresh air conduit, and the intake manifold. In the context of the present invention, the term "exhaust track" refers to any part of the exhaust gases pathway including, for example, the cylinder outlet, the exhaust manifold, any exhaust gases conduit and connections, and may include a muffler and exhaust pipe, venting fumes to the environment. The term "EGR track" refers to any part of an exhaust gases recirculation system between a shunt in the exhaust track that diverts a portion of the exhaust gases to the EGR system, and any conduit, valves, connections, or other parts of the EGR system that define a path for recirculated exhaust gases, until the EGR gases are introduced into the intake track.

As used herein the term "$\lambda$" refers to the stoichiometric ratio of oxygen in air to fuel. Stoichiometric ratio of oxygen in air to fuel means there is one mole of oxygen (in air) for each mole of carbon in a hydrocarbon fuel and one mole of oxygen for every two moles of hydrogen in fuel. This stoichiometry translates to a weight ratio of about 14.7:1 (w/w, air:gasoline) for gasoline. Higher $\lambda$ values indicate leaner mixtures, or more air per unit of fuel. Thus, $\lambda$ greater than 1 means a ratio (for gasoline) of greater than 14.7:1 w/w. Different fuel types require different stoichiometries. For example, stoichiometric air to fuel for methanol is about 6.5:1, ethanol is about 9.0:1, diesel is 14.4:1, natural gas is 16.6:1, and methane is 17.2:1.

Conventional internal combustion engines equipped with exhaust gas recirculation provide a heat exchanger, such as a radiator in the exhaust gases' recirculation path in order to cool the exhaust gases prior to reintroduction of the exhaust gases into the combustion chamber. In contrast, the inventive engines disclosed herein do not require a heat exchanger at all, thereby minimizing heat losses to the environment. Internal temperature control and engine cooling in the present invention is provided by the lean fuel mixtures, EGR, and water injection either into the intake manifold or directly into the cylinders of the engine. Accordingly, the inventive engines have been shown to operate at up to 50% thermodynamic efficiency. Nevertheless, in an embodiment a heat exchanger may be utilized.

Conventional Otto-cycle engines are limited to compression ratios of no more than 12:1 when using high octane fuels in a spark ignition engine, and no more than 23:1 in compression ignition engines. Compression ratios greater those noted above are generally understood to cause engine damage by, for example, inducing premature detonation of the fuel in the combustion chamber, and to suffer from excessive heat losses. However, high compression, when the cylinder pressure can be properly controlled has the benefit of increased efficiency in converting the combustion of fuel to mechanical energy.

Conventionally, EGR cooling is recognized as desirable to minimize pumping losses, control engine temperature, and minimize NOx production. In an embodiment of this invention, EGR gases are cooled internally without the need for an external heat exchanger (EGR cooler). The inventive methods allow much higher amounts of EGR to be utilized without a knock-limit penalty, without reduced charge density and without volumetric efficiency losses. This may be most effective on internal EGR loops, though the invention can be used with any method of EGR recirculation, and for both turbocharged and non-turbocharged engines, as well as both port fuel injected and direct fuel injected engines.

Conventionally, external EGR cooling is commonly employed. The inventive engines are designed to run at higher internal temperatures than conventional engines, which are made possible by the lean fuel mixtures, EGR systems, and internal cooling of the EGR with water. The phase transition of the water from liquid to vapor consumes heat energy present in the recirculated exhaust gases, thereby lowering the temperature of the recirculated exhaust gases to a temperature that is lower than the temperature of the re-circulated exhaust gases prior to introduction.

Figure 13:
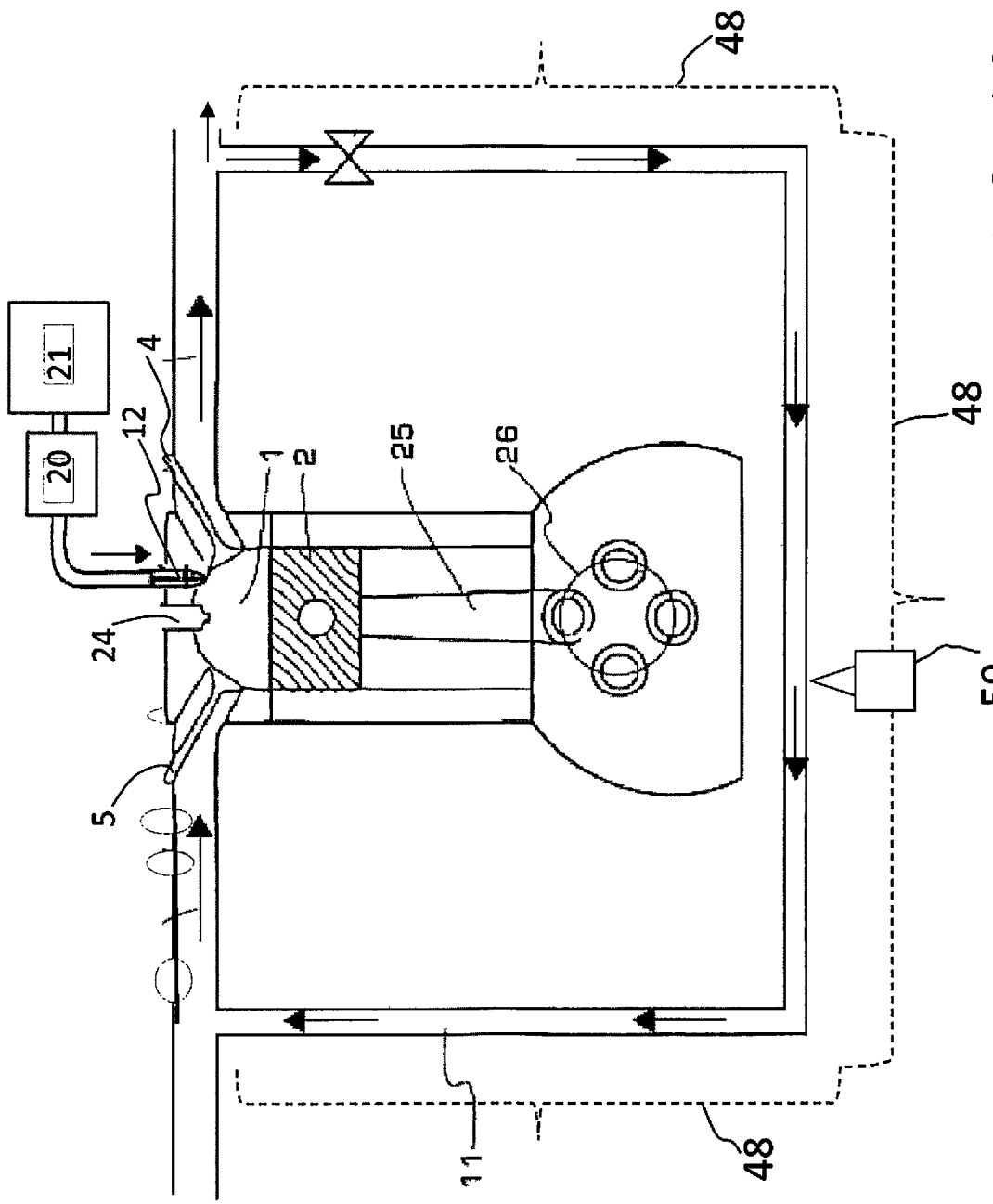
FIG. 13 depicts one or more locations of an apparatus to spray atomized water directly into the Exhaust Gas Recirculation track in an embodiment.

As further shown in FIG. 13, in an embodiment, cooling of the recirculated exhaust gases in the present invention, thus, occurs at one or more positions indicated along the broken line as positions 48 shown along the EGR track and intake track by way of a spray of atomized water directly into the recirculated exhaust gases. Thus, in the case where the exhaust gas is cooled after being introduced into the intake track, for example, the recirculated exhaust gas has essentially the same temperature at the point just prior to cooling in the intake track as at the exhaust manifold.

In an embodiment, the inventive EGR includes a water reservoir, a water handling system comprised of pipes or tubes and a rigid distribution rail, and one or more water injector(s), and a computer control system that uses a reference table to inject varying amounts of water in response to the engine load, speed and current EGR conditions.

The water can be injected into the engine either at the air intake port (port injection) or directly into the combustion chamber (direct injection). Direct injection is the preferred embodiment as it allows more accurate and precise control over the water spray timing and position when compared to port injection.

This system can be used with any internal combustion engine employing EGR; either two or four stroke, and fueled by a combustible liquid used for fuel, such as gasoline, diesel, ethanol, methanol, hydrogen, natural gas, or a mixture thereof, and with spark or compression ignition engines. The example embodiments discussed herein are of four stroke engines using either spark or compression ignition. However, based on the disclosure provided herein, one of ordinary skill in the art will readily appreciate the alterations and modifications necessary to apply the present invention to two stroke engines as well as other forms of reciprocating internal combustion engines.

In an embodiment, an internal combustion engine is provided, operating on a fuel, such as hydrocarbon fuel, with internally cooled exhaust gases recirculation, with at least one cylinder and a reciprocating piston therein, a combustion chamber in the cylinder, an air intake manifold with at least one air intake valve, an exhaust manifold with at least one exhaust valve, a fuel handling system with a fuel injector, and an ignition system; wherein the engine has a mechanical compression ratio greater than 12:1 and less than 40:1, and operates at an air to fuel ratio expresses as a value $\lambda$, said $\lambda$ being greater than 1 and less than 7.0; wherein the engine has means to recirculate exhaust gases internally or externally; wherein the engine internally cools the recirculated exhaust gases by direct contact with predetermined quantity of atomized water injected into the exhaust gases without the use of a mixed medium heat exchanger that chills the recirculated exhaust gases.

Lean fuel mixtures are desirable in order to reduce throttling loss resulting from having to operate the engine with a partially closed throttle as occurs when the engine is operating at a steady speed. However, leaner fuel mixtures can burn hotter in a specific range of $\lambda$ greater than 1, which can result in increased emissions of $NO_x$ at $\lambda$ greater than 1. Operating an internal combustion engine with a lean mixture can quickly result in combustion chamber temperatures exceeding 2500° F. In addition to increasing $NO_x$ production, the excessively high temperature in the combustion chamber can lead to premature detonation of the fuel (knocking) and warping of the various components of the engine.

In an embodiment, a method of operating an internal combustion engine is provided, wherein the engine uses a fuel, such as hydrocarbon fuel, with internally cooled exhaust gases recirculation, with at least one cylinder and a reciprocating piston therein, a combustion chamber in the cylinder, an air intake manifold with at least one air intake valve, an exhaust manifold with at least one exhaust valve, a fuel handling system with a fuel injector, and an ignition system. The engine has a mechanical compression ratio greater than 12:1 and less than 40:1, and operates at an air to fuel ratio expresses as a value $\lambda$, said $\lambda$ being greater than 1 and less than 7.0. Additionally, the engine has means to recirculate exhaust gases internally or externally, and internally cools the recirculated exhaust gases by direct contact with predetermined quantity of atomized water injected into the exhaust gases without the use of a mixed medium heat exchanger that chills the recirculated exhaust gases. In another embodiment, a method of cooling EGR gases in an internal combustion engine is provided.

The optimum λ for the inventive engines depends on the ignition type. For spark-ignition engines running gasoline, gasoline blends (for example, with ethanol), or natural gas (primarily methane), λ will be in the range of greater than 1 to a maximum of about 3.0. In alternative embodiments, λ in spark ignition engines according to this invention will be in a range of from about 1.2 to about 2.8, or about 1.2 to about 2.3, or about 1.5 to about 2.0, or about 1.5 to about 1.75, or about 2.0. For compression ignition engines (diesels), λ will be in the range of greater than 1 to a maximum of about 7.0. In alternative embodiments, λ in the inventive engines will be in a range of from about 1.4 to about 6.0, or about 1.5 to about 5.0, or about 2.0 to 4.0, or about 1.5, or about 2.0, or about 2.5, or about 3.0, or about 3.5, or about 4.0.

The optimum compression ratio for the inventive engines depends on the ignition type. For spark-ignition engines running gasoline, gasoline blends, or natural gas, conventional engines have a typical compression ratio of 10:1, with a maximum compression ratio of about 12:1 using higher octane fuels. These compression ratio limits are required in order to control engine knock that would otherwise occur at higher compression ratios. By using higher compression ratios than conventional engines, the inventive engines have the benefit of superior thermodynamic efficiency according to the Otto cycle, in which thermodynamic efficiency is a function of compression ratio.

The compression ratio of the inventive engines in spark-ignition mode is in the range of greater than 12:1 to about 20:1. In alternative embodiments, the compression ratio is 13:1 to about 18:1, or about 14:1 to 16:1, or about 14:1, or about 15:1, or about 16:1, or about 18:1. For compression ignition engines, the compression ratio will be from about 14:1 to about 40:1. In alternative embodiments, the compression ratio is in a range of about 14:1 to about 30:1, or about 15:1 to about 25:1, or about 16:1 to about 20:1, or about 16:1, or about 17:1, or about 18:1, or about 19:1, or about 20:1, or about 21:1, or about 22:1.

As noted above, internal combustion engines using spark ignition are generally limited to compression ratios of no more than 12:1 in order to avoid premature detonation. Thus, usage of compression ratios above 12:1, as in the present invention, is not obvious given the general knowledge of internal combustion engines. The present invention avoids the dangers associated with compression ratios higher than 12:1 by the use of internally cooled EGR.

EGR is well known to provide several benefits to internal combustion engines and is commonly used. However, a shortcoming of EGR is the addition of excess heat into the combustion chamber, which tends to increased premature ignition (knock) and may increase $NO_x$ emissions, which are dependent on combustion temperature. Consequently, as shown in FIG. 13, a spraying apparatus 59 is used to spray atomized water from the water reservoir 8 (not shown) directly into the EGR track 11 or intake track in the inventive engine to cool the reintroduced exhaust gases to a controlled temperature.

Because the water-cooled EGR reduces the temperature within the combustion chamber, a significantly leaner fuel mixture can be used without producing elevated $NO_x$ emissions or knocking. The leaner fuel is the second feature that makes the high compression ratios possible in the present invention.

The amount of water injected is a function of the fuel flow and the amount of EGR employed. Fuel flow in modern engines is typically determined from a mass air flow sensor or a manifold pressure sensor, which provides data to an engine control computer that determines the quantity of fuel fed to the fuel injectors. The quantity of EGR gases shunted back into the engine is also controlled by the engine control computer. In the case of external EGR, the amount of EGR is controlled by the EGR valve. In internal EGR embodiments, the valve timing is independently controllable with variable valve timing, for example with cam phasing. Other multipliers are typically used by an engine control computer to control fuel flow and EGR include engine load, intake air temperature, exhaust oxygen sensor, and engine rpm. In the inventive engines, the water flow will be determined by the computer using the same parameters.

The amount of water injected can be expressed as a percentage by weight of the EGR gases injected into a cylinder prior to ignition. In an embodiment, the amount of water injected is about 10% to about 125% of the recirculated exhaust gases (EGR) by weight (w/w). In an embodiment, the amount of water injected is about 10% to about 100% of the EGR w/w, or about 25% to about 100% of the EGR w/w, or about 20% to about 100% of the EGR w/w, or about 75% to about 125% of the EGR w/w, or about 25% w/w, or about 50% w/w, or about 75% w/w, or about 100% w/w.

The amount of water injected in the inventive engines may be reduced compared to prior art water injector embodiments, without reducing the amount of water or water vapor in the cylinder during ignition, because EGR gases contain substantial amounts of water vapor, since water is a combustion product of hydrocarbon fuels. Because the EGR gases are not treated or cooled in the inventive engines (in contrast to conventional EGR systems), the full load of water vapor in the EGR gases will be circulated back to the engine. In one aspect, this feature of the inventive EGR systems will reduce the amount of liquid water necessary for injection into the engine that must be carried on board a vehicle (for an engine in a vehicle) at any given moment.

The water may be injected with an injector adapted to injecting liquids into an engine intake manifold or cylinder. In an embodiment, a water injector may inject an atomized spray of water into the intake manifold in the presence of EGR gases prior to being drawn or injected into the cylinder prior to ignition. In an embodiment, a water injector may inject an atomized spray of water directly into the cylinder, after EGR gases have been injected or drawn into the cylinder.

The phrase "internally cooled exhaust gases recirculation", as understood in the context of the present invention, is intended to mean that no mixed medium heat exchanger is employed in the EGR track. Thus, in an engine employing internally cooled exhaust gases recirculation, there is no heat exchanger, radiator, cooling coils, jacketed cooling, air cooling fins, or other external cooling apparatus in the EGR track. The EGR track, within the context of the present invention, is defined as the exhaust gases path between the points where a portion of the exhaust gases are diverted from the exhaust track to the injection of the diverted exhaust gases into the intake track.

By contrast, EGR cooling with a heat exchanger is well known in the prior art. In accordance with the present invention, the only cooling of EGR gases is from internal cooling by water directly injected into the EGR track, the intake track after injection of EGR gases, or by direct injection of water into the cylinder after EGR gases are introduced therein.

The predetermined quantity of atomized water injected into the exhaust gases need not be pure water. In an embodiment, the water may include a lower alkanol, especially a $C_1$ to $C_4$ alcohol, for example, methanol, ethanol, n-propanol, isopropanol, or any isomer of butyl alcohol. The use of a solution of an alcohol in water may be, for example, to depress the melting point of the water for EGR cooling in cold climates. For example, a 30% mixture of ethanol in water (w/w) has a melting/freezing point of −20° C.

Figure 4:
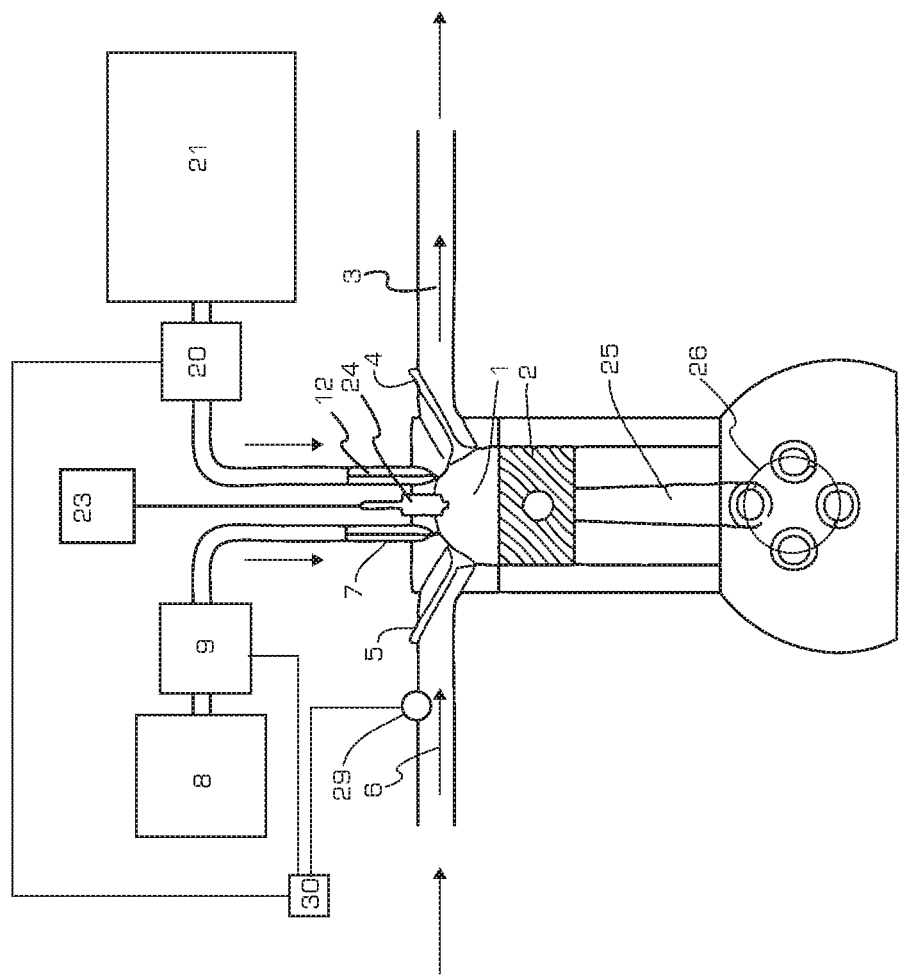
FIG. 4 is a schematic of a naturally aspirated internal combustion engine of the present invention with direct fuel injection and engine systems showing internal EGR, via intake or exhaust valves, with direct EGR cooling via a water injector directly into the combustion chamber.

An internal EGR embodiment of this invention is illustrated in FIG. 4, showing a schematic of a naturally aspirated internal combustion engine with direct fuel injection and engine systems showing internal EGR. With internal EGR, no external exhaust gas recirculation path is provided. Rather, exhaust gases are recirculated "internally" with valve phasing or valve overlap, with direct EGR cooling via a water injector directly into the combustion chamber. In this embodiment, the timing of intake valve 5 or exhaust valve 6 must be independently computer controlled to provide valve phasing or valve overlap EGR.

The operation of the internal combustion engine of the present invention, shown in FIG. 4, conforms generally to a standard four stroke engine. An air intake valve 5 opens at the beginning of an intake stroke of the piston to allow air to flow into the combustion chamber 1. The air intake valve 5 closes prior to the initiation of the compression stroke in which the piston 2 compresses the air and fuel in the combustion chamber 1. Shortly before the top of the piston 2 travel, i.e., top-dead-center (TDC), the ignition system, i.e., spark plug 24 ignites the fuel/air mixture in the combustion chamber 1. After the piston cycle past TDC, the ignited fuel pushes the cylinder downward in the power stroke to turn a crankshaft 26. When the piston has reached its lowest point of travel in the cylinder during the power stroke, i.e., bottom-dead-center (BDC), the internal combustion engine begins the exhaust stroke. In the exhaust stroke the exhaust valve 4 opens and the upward travel of the piston 2 forces the exhaust gases out of the combustion chamber 1

In this internal EGR embodiment, exhaust gases are internally recirculated through valve phasing or valve overlap, by special sequencing of exhaust valve 4 or intake valve 5. For example, the intake valve may open during part of the exhaust stroke to admit some exhaust gases into the intake manifold. These gases are then recirculated back into the cylinder during the intake stroke. In another embodiment, the exhaust valve may be opened during the intake stroke, thereby admitting some of the exhaust gases in the exhaust manifold to the cylinder. Thus, in the embodiment of FIG. 4, one or both of the intake and exhaust valves must be independently controlled to effect the necessary valve phasing.

As shown in FIG. 4, water from reservoir 8 is pressurized by pump 9 and is injected through injector 7 directly into the combustion chamber 1 to cool the rebreathed exhaust gases. The amount of water injected is determined and controlled by engine control computer 30. Also depicted in FIG. 4 is a fuel reservoir 21, a fuel pump 20, a fuel injector 12, a coil 23 and a piston rod 25.

The engine control computer 30 has connections to manifold pressure sensor 29, water pump 9, fuel pump 20, and variable valve timing controls (not shown). An embodiment of the engine depicted in FIG. 4 operates at the high compression ratios, lean fuel mixtures, and predetermined amount of injected water in accordance with this invention.

Figure 5:
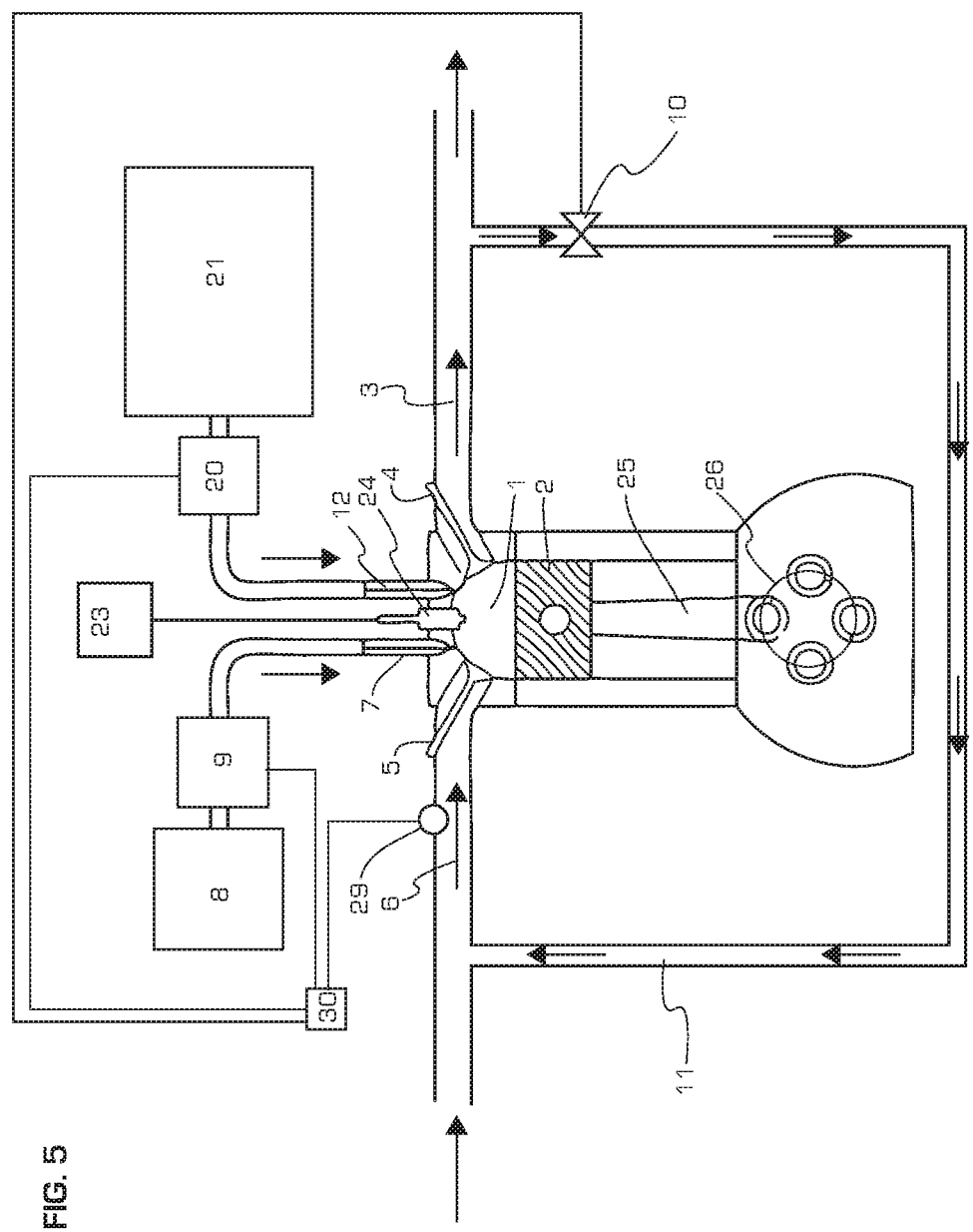
FIG. 5 is a schematic of a naturally aspirated internal combustion engine of the present invention with direct fuel injection and engine systems showing the flow of exhaust gases through an external EGR loop with direct EGR cooling via a water injector directly into the combustion chamber.

Another embodiment of this invention is described in FIG. 5, showing a schematic of a naturally aspirated internal combustion engine with direct fuel injection and engine systems showing the flow of exhaust gases through an external EGR loop with direct EGR cooling via water injector 7, which injects water directly into the combustion chamber 1. Thus, exhaust gases from high compression combustion chamber 1 exit during the exhaust stroke of high compression piston 2 into the exhaust track 3. EGR valve 10, controlled by engine control computer 30, allows a controlled amount of exhaust gases to enter the EGR track 11 to be delivered to the intake track 6 without passing through an external heat exchanger. The recirculated exhaust gas temperature is higher than the intake air charge temperature.

Water injector 7 injects a predetermined amount of water into the combustion chamber with the recirculated exhaust gases from EGR track 11 and with fuel injected directly into the combustion chamber through injector 12. The water injected into the chamber reduces the elevated temperature of the recirculated exhaust gases directly in accordance with this invention. Also depicted in FIG. 5 is engine control computer 30 with connections to manifold pressure sensor 29, water pump 9, fuel pump 20, and EGR valve 10. An embodiment of the engine depicted in FIG. 5 operates at the high compression ratios, and lean fuel mixtures in accordance with this invention.

Figure 6:
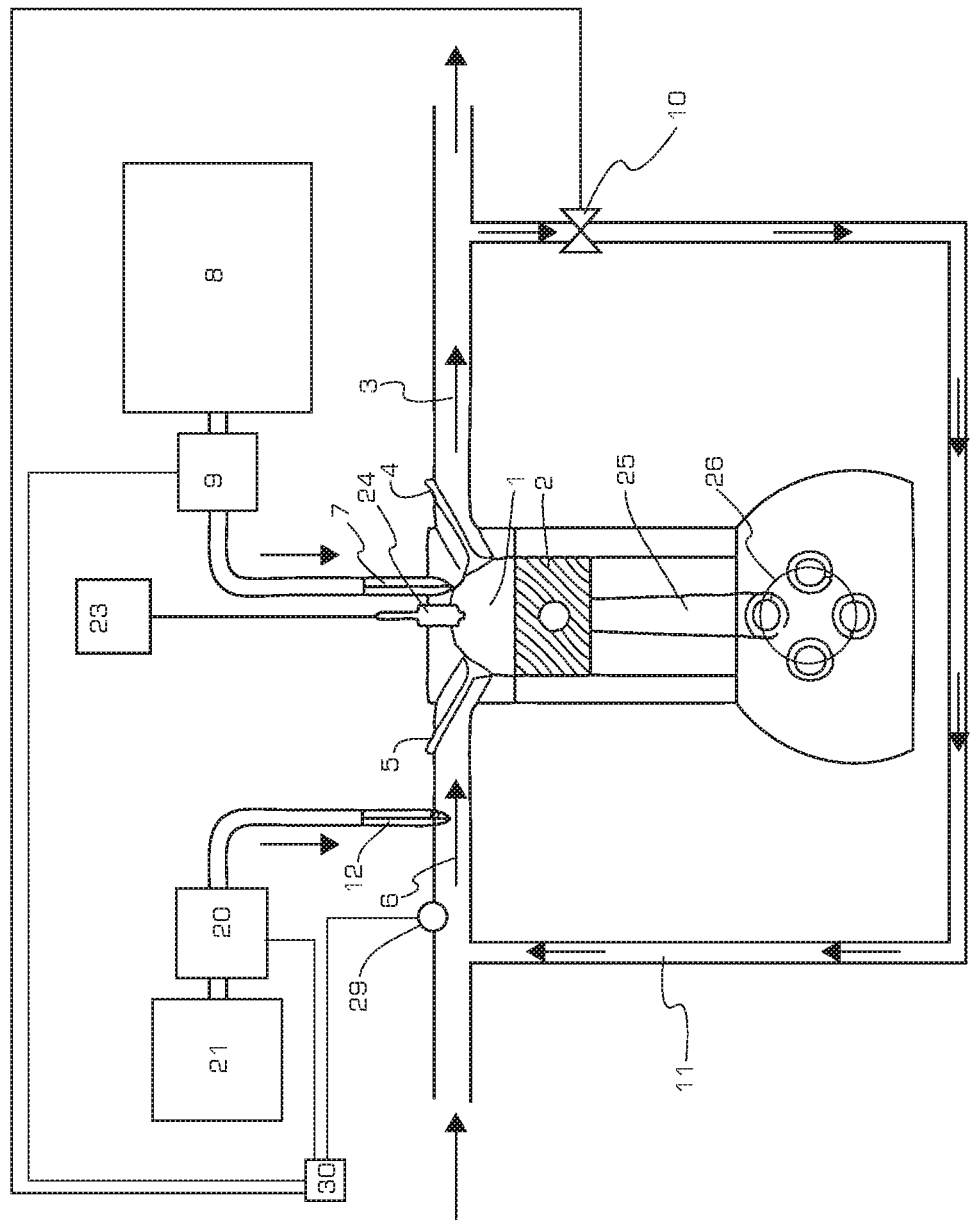
FIG. 6 is a schematic of a naturally aspirated internal combustion engine of the present invention with port fuel injection and engine systems showing the flow of exhaust gases through an external EGR loop with direct EGR cooling via water injector directly into the combustion chamber.

Another embodiment is shown in FIG. 6, illustrating a schematic of a naturally aspirated internal combustion engine with port fuel injection, direct water injection, and engine systems showing the flow of exhaust gases through an external EGR loop with direct EGR cooling via water injector directly into the combustion chamber. Exhaust gases from high compression combustion chamber 1 exit during the exhaust stroke of the high compression piston 2 into the exhaust track 3. EGR valve 10 allows an amount of exhaust gases to enter the EGR track 11 to be delivered to the intake track 6 without passing through an external heat exchanger. The recirculated exhaust gas temperature is higher than intake air charge prior to water injection. In this embodiment, fuel is injected into the intake track (port injection), rather than directly into the cylinder, through fuel injector 12.

Water injector 7 injects a specific and controlled amount of water directly into the combustion chamber with the recirculated exhaust gases from EGR track 11 and cools the elevated gas temperature prior to ignition.

Figure 7:
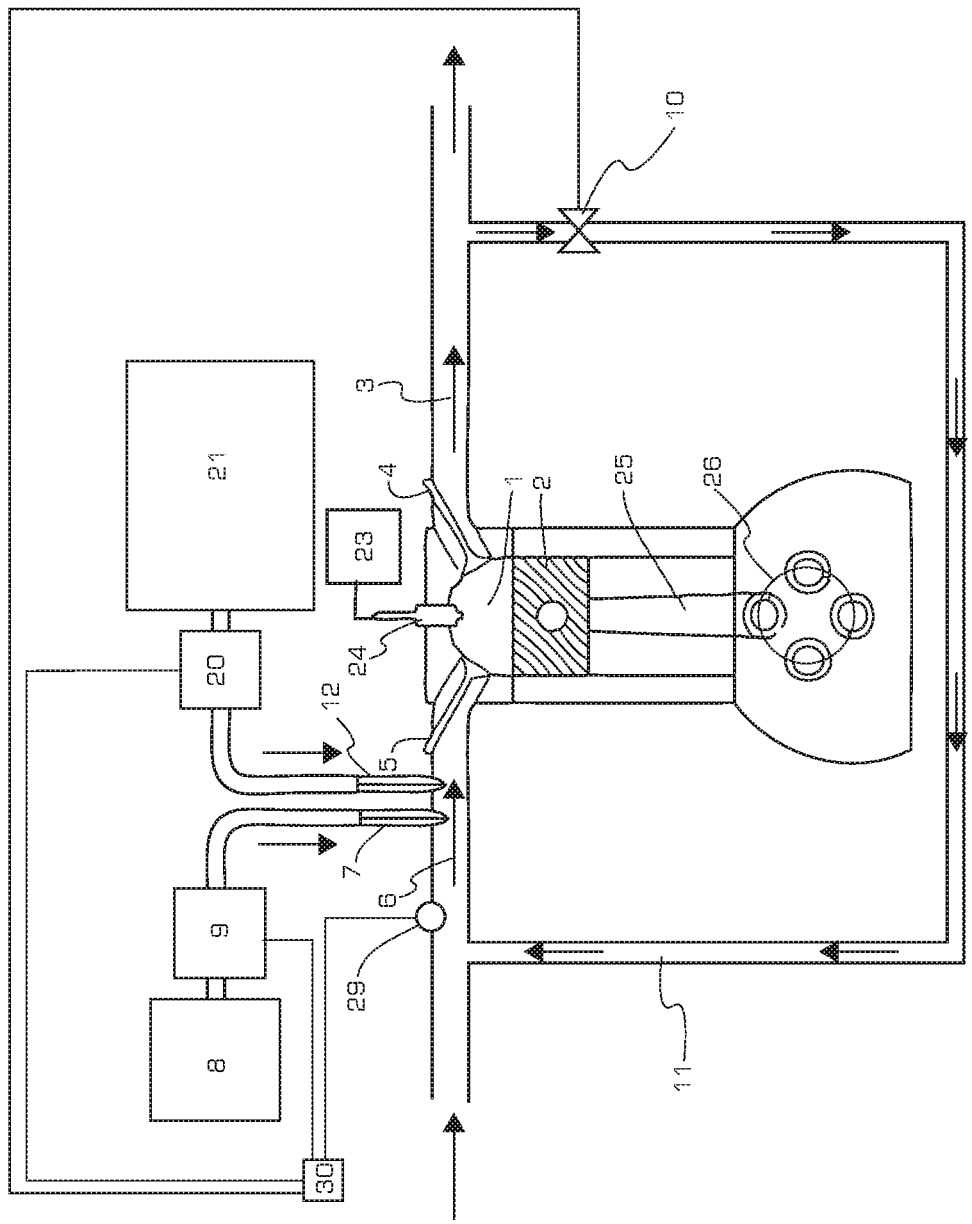
FIG. 7 is a schematic of a naturally aspirated internal combustion engine of the present invention with port fuel injection and engine systems showing the flow of exhaust gases through an external EGR loop with direct EGR cooling via water injection in the intake track.

Another embodiment is shown in FIG. 7, illustrating a schematic of a naturally aspirated internal combustion engine with port fuel injection and port water injection. Engine systems are shown directing a flow of exhaust gases through an external EGR loop with EGR cooling via water injection in the intake track. Exhaust gases from high compression chamber 1 exit during the exhaust stroke of the high compression piston 2 into the exhaust track 3. EGR valve 10 allows a controlled amount of exhaust gases to enter the EGR track 11 to be delivered to the intake track 6 without passing through an external heat exchanger. The recirculated exhaust gases admitted to intake track 6 have a greater temperature than the intake air. The EGR gases are cooled by water from reservoir 8 pressurized through pump 9 and injected into the intake track by injector 7. Gases with fresh air, cooled EGR gases, water vapor, and fuel are aspirated into combustion chamber 1 during the intake stroke. The engine control computer, sensors, and related connections are omitted for brevity from FIG. 7.

Figure 8:
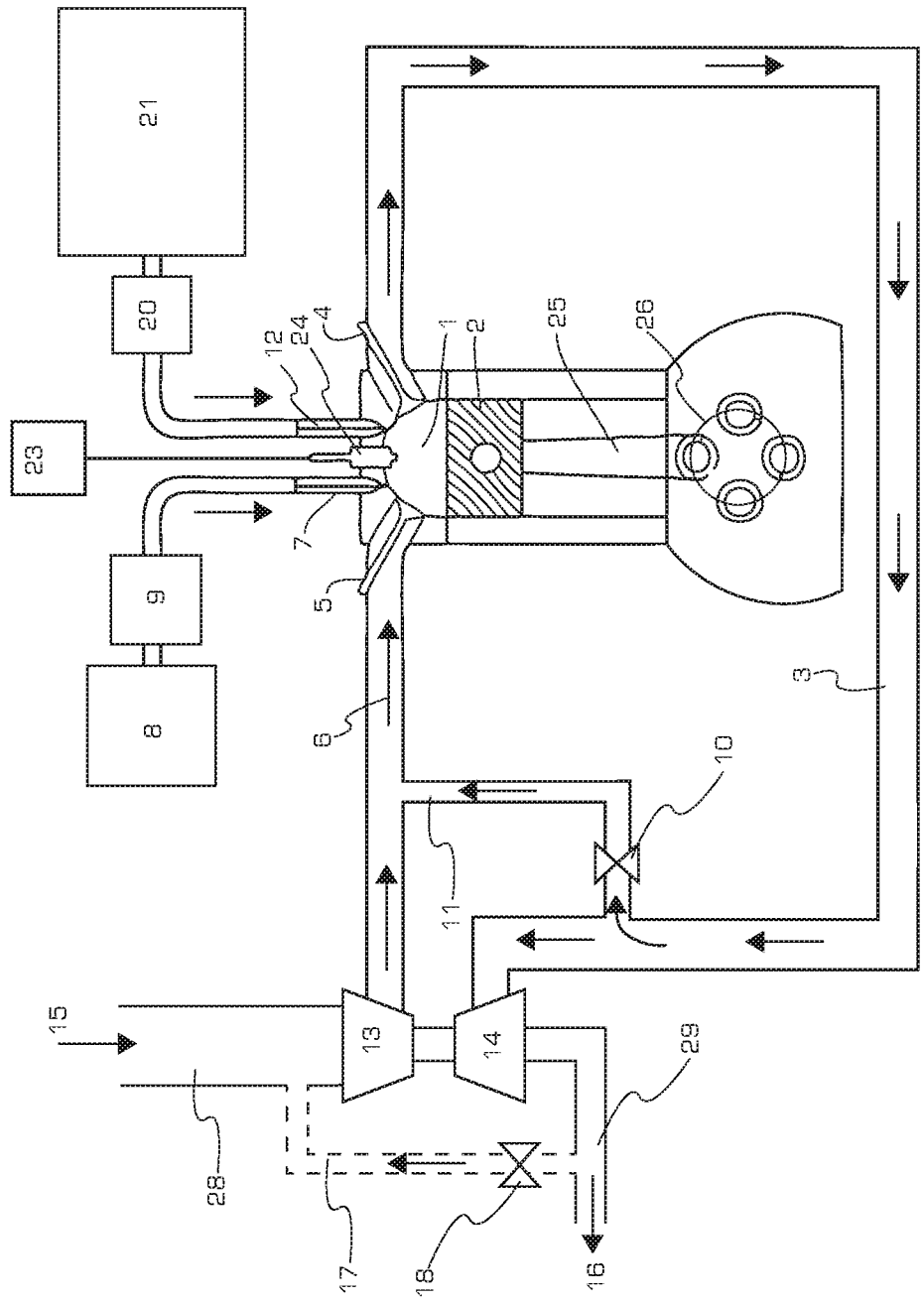
FIG. 8 is a schematic of a turbo charged internal combustion engine of the present invention with direct fuel injection and engine systems showing the flow of exhaust gases through an external EGR loop, high pressure and low pressure, with direct EGR cooling via a water injector directly into the combustion chamber.

Another embodiment is shown in FIG. 8 illustrating a schematic of a turbocharged internal combustion engine with direct fuel injection, direct water injection, and external EGR. Engine systems are shown directing the flow of exhaust gases through an external EGR loop, which may be either a high pressure loop 11 or a low pressure loop 17, or both. In this embodiment, exhaust gases following ignition from high compression chamber 1 exit to exhaust track 3 during the exhaust stroke of the high compression piston 2. The engine exhaust in this embodiment drives turbine 14, which is connected to compressor 13 that pressurizes fresh air 15 from air intake path 28 and other gases in intake manifold 6. In a high pressure EGR bypass 11, exhaust gases from exhaust pipe 3 are shunted to the intake manifold before turbine 14. EGR valve 10, under computer control as described above, controls the amount of exhaust gases entering the EGR bypass 11 to be delivered to the high pressure intake track 6.

Accordingly, the EGR gases enter the intake manifold 6 without passing through an external heat exchanger, which provide recirculated exhaust gases temperature at higher than the intake air charge temperature. In the case of the low pressure EGR loop, a portion of exhaust stream 16, after exiting the turbocharger turbine 14, is shunted to air intake into the fresh air intake 28 through EGR bypass 17 controlled by valve 18.

Water from reservoir 8 is pressurized by pump 9 and fed to injector 7 to inject a controlled amount of water directly into the combustion chamber (1) containing the recirculated exhaust gases and with fuel injected directly into the combustion chamber through injector 12. The water injected into the chamber 1 reduces the elevated temperature of the recirculated exhaust gases directly. The engine control computer, sensors, and related connections are omitted for brevity from FIG. 8.

Figure 9:
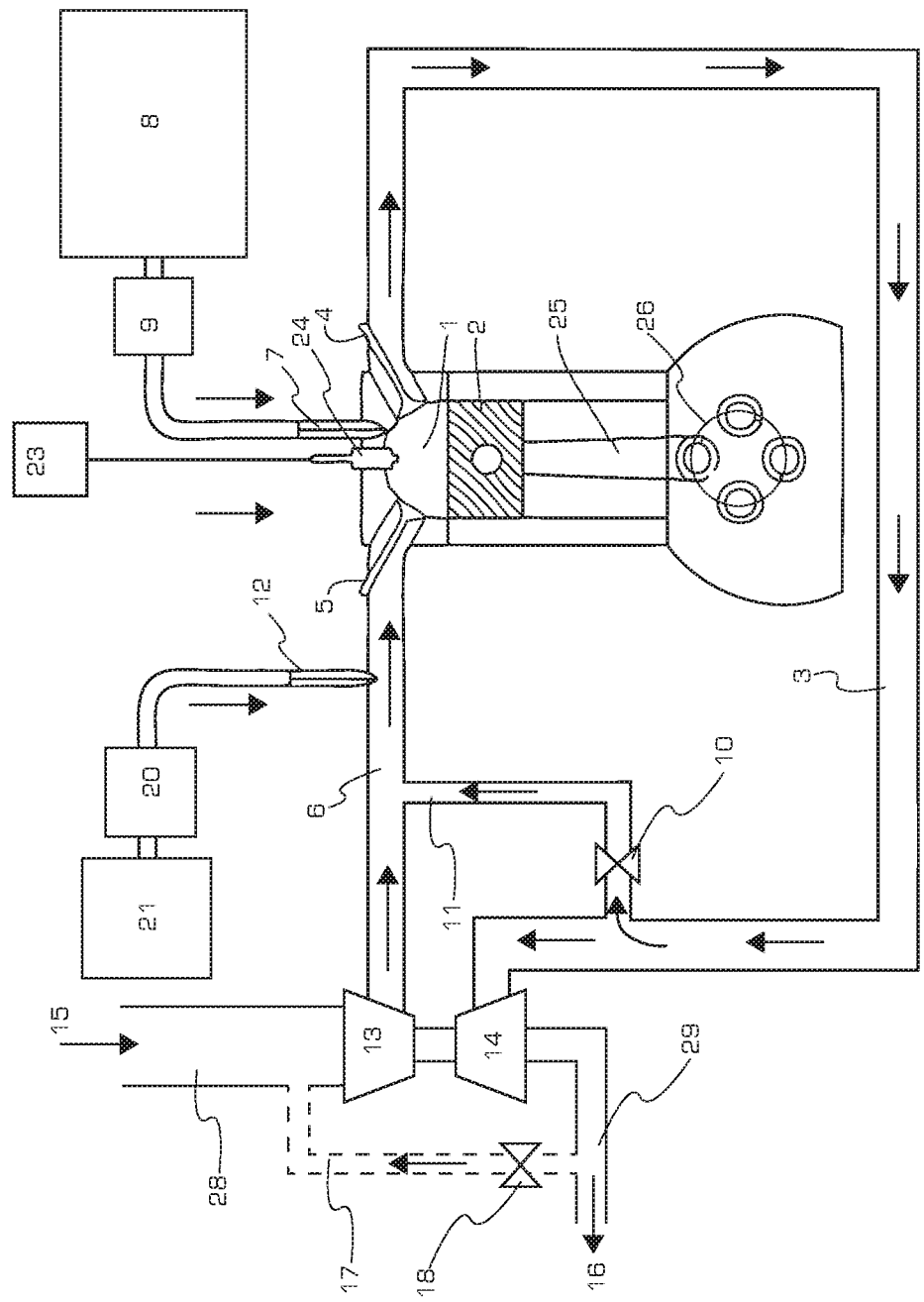
FIG. 9 is a schematic of a turbo charged internal combustion engine of the present invention with port fuel injection and engine systems showing the flow of exhaust gases through an external EGR loop, high pressure and low pressure, with direct EGR cooling via a water injector directly into the combustion chamber.

Another embodiment is shown in FIG. 9, illustrating a schematic of a turbocharged internal combustion engine with port fuel injection, direct water injection, and engine systems showing the flow of exhaust gases through an external EGR loop, high pressure and low pressure, with direct EGR cooling via a water injector in the intake manifold 6. This embodiment is similar in operation to the turbocharged embodiment of FIG. 8, with high and low EGR bypass embodiments, but with port fuel injection rather than direct fuel injection.

In another embodiment (not shown), a turbocharged engine can employ the inventive EGR and water injection, with port fuel and port water injection. In another embodiment, a supercharger is used. By the term "turbocharger" is meant an air compressor driven by exhaust gases. By the term "supercharger" is meant an air compressor driven by a mechanical linkage to the engine.

In other embodiments, the embodiments illustrated in FIGS. 4-9 can be used with compression ignition engines, but without the spark ignition system.

Table 1 shows experimental results of a VW 1.9 L 4 cylinder turbocharged direct injection diesel engine, with 19:1 compression ratio, and external EGR modified to include a water injector in each cylinder. The $\lambda$ varies depending on engine load, but was never less than 1.1, and ranged up to about 1.5 in this test engine. EGR and $\lambda$ were inversely proportional, so that at higher $\lambda$, EGR was reduced. EGR was varied from 0% to 30%. Water was varied from 0% to 100%. The highest operating efficiencies (rows 17-21) had elevated NOx production. Increasing the water amount or EGR amount decreased NOx production significantly with minimal effect on overall efficiency, as shown in experiments 5, 11, 21 and 23.

TABLE 1

Experimental results with a four cylinder diesel engine.

| No. | BMEP | Speed RPM | EGR Rate % | Water/Fuel % | BSFC g/kWh | BSFC $\lambda$ g/kWh | $\eta$Fc $\lambda$ % | $\eta$Fc % | NOx (ppm) |
|---|---|---|---|---|---|---|---|---|---|
| 1 | 6BAR | 1800 | 0 | 25 | 233.1 | 236.7 | 35.2 | 35.7 | 451 |
| 2 | 6BAR | 1800 | 0 | 50 | 233.1 | 240.5 | 34.6 | 35.7 | 380 |
| 3 | 6BAR | 1800 | 0 | 100 | 234.8 | 246.7 | 33.7 | 35.5 | 317 |
| 4 | 6BAR | 1800 | 10 | 25 | 233.1 | 236.8 | 35.1 | 35.7 | 462 |
| 5 | 6BAR | 1800 | 10 | 50 | 233.4 | 240.5 | 34.6 | 35.7 | 413 |
| 6 | 6BAR | 1800 | 10 | 100 | 232.8 | 242.6 | 34.3 | 35.8 | 321.8 |
| 7 | 6BAR | 1800 | 20 | 25 | 234.7 | 231.4 | 36 | 35.5 | 242.9 |
| 8 | 6BAR | 1800 | 20 | 50 | 234.7 | 232 | 35.9 | 35.5 | 191 |
| 9 | 6BAR | 1800 | 20 | 100 | 237.9 | 237.5 | 35.1 | 35 | 142.8 |
| 10 | 6BAR | 1800 | 30 | 25 | 247.1 | 241.9 | 34.3 | 33.7 | 70.5 |
| 11 | 6BAR | 1800 | 30 | 50 | 248.7 | 242.4 | 34.4 | 33.5 | 57.3 |
| 12 | 6BAR | 1800 | 30 | 100 | 252.9 | 245.6 | 33.9 | 32.9 | 38.4 |
| 13 | 6BAR | 1800 | 0 | 0 | 231 | 233.7 | 35.6 | 36 | 474 |
| 14 | 6BAR | 1800 | 35 | 25 | 272.1 | 258.5 | 32.3 | 30.7 | 51.75 |
| 15 | 6BAR | 1800 | 0 | 0 | 235.1 | 235.2 | 35.4 | 35.4 | 472.9 |
| 16 | 12BAR | 2000 | 0 | 0 | 209.4 | 205.3 | 39.7 | 40.5 | 1663 |
| 17 | 12BAR | 2000 | 0 | 25 | 209.6 | 209 | 39.7 | 39.8 | 1492 |
| 18 | 12BAR | 2000 | 0 | 50 | 210.2 | 209.4 | 39.6 | 39.7 | 1291 |
| 19 | 12BAR | 2000 | 0 | 100 | 211.3 | 215 | 39.4 | 38.7 | 1231 |
| 20 | 12BAR | 2000 | 10 | 25 | 210.8 | 209 | 39.5 | 39.8 | 1195 |
| 21 | 12BAR | 2000 | 10 | 50 | 210.6 | 208.9 | 39.5 | 39.8 | 1094 |
| 22 | 12BAR | 2000 | 10 | 100 | 211.1 | 215 | 39.4 | 38.7 | 621 |
| 23 | 12BAR | 2000 | 20 | 25 | 215.5 | 214 | 38.6 | 38.8 | 374 |
| 24 | 12BAR | 2000 | 20 | 50 | 215.8 | 216.6 | 38.6 | 38.4 | 403 |

The engine test results in Table 1 show a maximum efficiency of 39.5% with 10% EGR and 25% or 50% water injection (experiments 20 and 21).

In the present invention, the amount of atomized water: air:fuel mixture, and the amount of EGR employed at any given time is controlled by an engine controller (ECU). Specifically, the engine controller receives signals relating to position of the accelerator, exhaust temperature, vehicle velocity, valve timing and position, air:fuel ratio, for example. These signals are generated by respective sensors, as well known in the art and provided electronically to the engine controller. The signals provide the control parameters for adjusting the amount of EGR, as well as the amount of atomized water injected into the EGR track to attain a desired temperature of the recirculated exhaust gases. In addition, the air:fuel mixture is adjusted based on the above signals to optimize the power output and minimize throttling loss during engine idle and cruising conditions.

In situations where a vehicle employing the inventive engine is cruising, the air:fuel mixture is at its leanest. However, this creates a significant amount of heat within the combustion chamber, as explained previously. Thus, the EGR is cooled to a lower temperature by introducing a greater volume of atomized water into the EGR track. In this way the compression ratio can be kept high and the air:fuel ratio can be optimized.

The volume of EGR introduced into the combustion chamber is also controlled to optimize the thermal mass of the combustion chamber based on the signals identified above. The fine control provided by the engines of the present invention is not possible with external EGR heat exchangers, since the heat exchangers introduce a response lag into the system. In other words, adjustments made to the cooling of the recirculated exhaust gases at an external heat exchanger would not be realized in the combustion chamber until the exhaust gases in the heat exchanger finally arrive in the combustion chamber, which could take seconds.

In an embodiment of the present invention, the inventive engine utilizes internal EGR with direct cooling, as this provides the most immediate and precise control of EGR volume and exhaust gas temperature control.

Water injection volume and EGR volume is controlled based on pre-stored or periodically generated tables accessible by the engine controller. In one embodiment, the tables are generated experimentally by running injection sweeps. Specifically, the engine is held at a constant speed and load while varying the amount of water injection and EGR. The injection sweeps are performed at various speeds and loads so that an optimal value, or set of optimal values are identified for water injection and EGR under most operating conditions. Data is interpolated between test results to produce a full matrix for the points that lie between actual test points. Thus, the ECU is able to provide an optimized water injection and EGR volume to the combustion chamber in order to maintain desired operating parameters when the engine runs through various loads and speeds.

Figure 10:
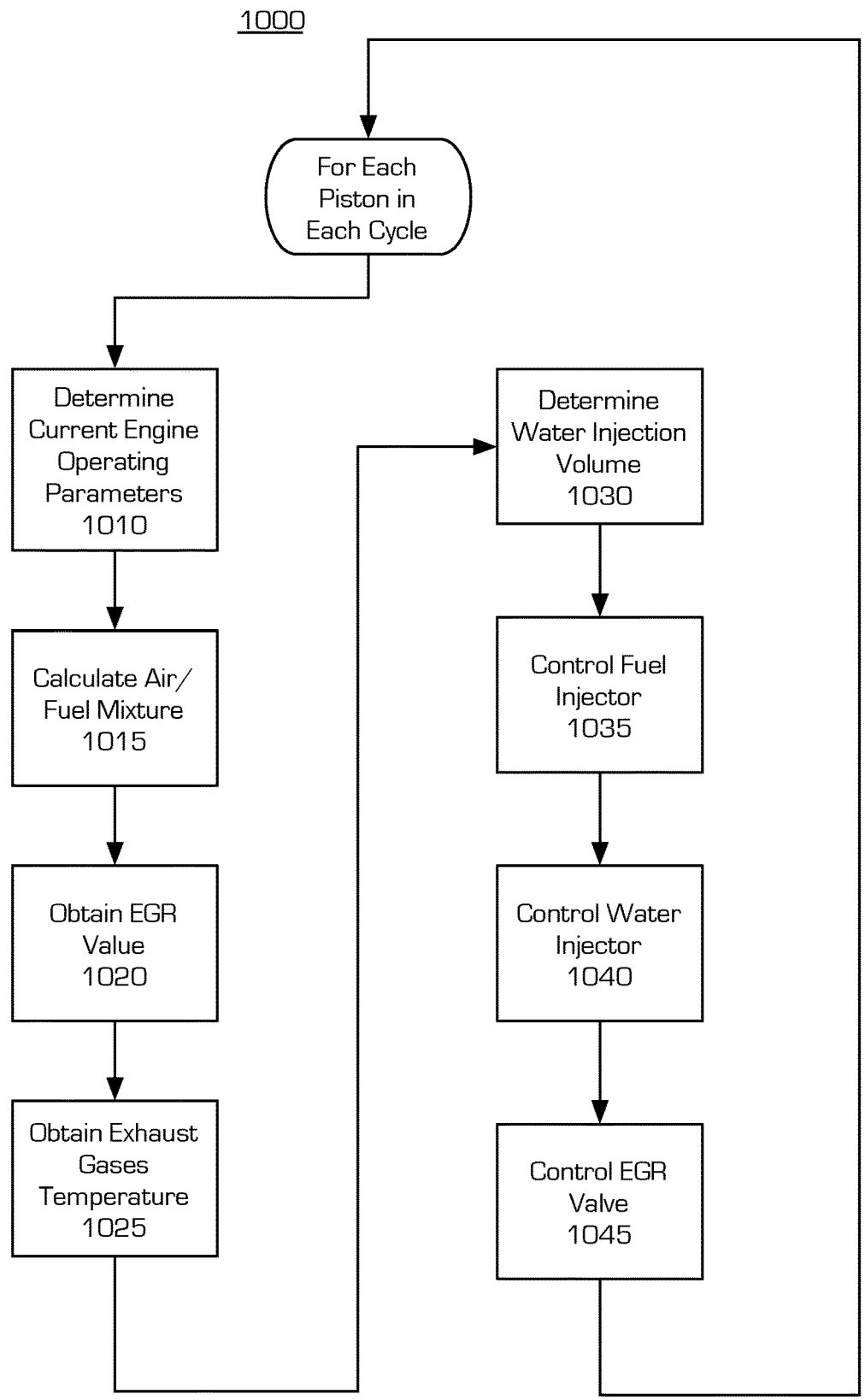
FIG. 10 is a flow diagram of a control process performed by an embodiment of the present invention.

More specifically, a method 1000 for controlling the water and EGR for each cylinder of an internal combustion chamber is described in FIG. 10. At 1010, the ECU determining current engine operating conditions including, e.g., engine RPM, load, mass air flow. At 1015, the desired air/fuel mixture is determined based on operating parameter such as the mass air flow and RPM, for example.

The amount of EGR is obtained at 1020 based on the operating parameters as well as the air/fuel mixture. The amount of EGR may be obtained empirically or based on a stored lookup table by the ECU. Additionally, the temperature of the exhaust gases is sensed in 1025 and reported to the ECU.

Based on the air/fuel mixture, compression ratio and exhaust temperature, the necessary amount of cooling is calculated and the appropriate amount of water injection is determined in 1030 by the ECU. The amount of water to be injected may be empirically calculated or determined based on a pre-stored lookup table accessible by the ECU.

Based on the above determined values for air/fuel mixture, EGR level and Water injection volume, the ECU controls the fuel injector of the current cylinder to inject air and fuel, at the calculated air/fuel ratio, into the combustion chamber prior to top-dead-center (TDC) of the piston in 1035. Additionally, at 1040 the water injector, and simultaneously, at 1045 the EGR valve, are controlled to introduce the determined amounts of atomized water and exhaust gases into the combustion chamber prior to TDC. In the present invention, the EGR valve may constitute a valve disposed on an external EGR track, an exhaust valve which is held open for a duration to allow exhaust gases to recirculate back into the combustion chamber, or an air intake value coupled to an EGR track, as described in greater detail above.

The atomized water and exhaust gases should be introduced at the same time in order to induce more thorough mixing and cooling by the injected water, thus reducing the risk of premature ignition of the fuel in the combustion chamber. Alternatively, the water and exhaust gases may be introduced prior to introduction of the air/fuel mixture.

The ECU may continually monitor the performance of the engine and adjust the values of water and EGR in their respective lookup tables.

That is, in one embodiment, using the predetermined information stored in one or more water injection and EGR tables, the engine controller, will compute the control parameters to affect the engine output conditions such as the amount of atomized water and exhaust gases to be injected into the combustion chamber. These adjustments are affected by the engine controller communicating messages for controlling actuation (e.g., dwell time) of the fuel injector, communicating messages to control the timing of water injection and the volume (before TDC) of atomized water injection, and controlling the volume (before TDC) of exhaust gases introduced into the combustion chamber, according to the embodiment described herein.

At an engine cycle-by-cycle basis, given the current sensed conditions values, and in response to the current temperature and pressure readings, and other variables, e.g., environmental conditions such as ambient temperature, the engine controller will coordinate the operation of the system by sending out control messages for modifying the fuel injection amount and timing, and control messages that control the amount of water injection (whether port or cylinder direct-injected) relative to the timing of the spark ignition (advance) at the cylinder during the compression stroke for maximum efficiency, compression and cooling as described herein.

It is understood, that the monitoring and control of the engine operations at any particular cycle of operation of the engine may be adjusted based on the operation during the prior cycle (including time average of a few prior cycles) to ensure ignition and water injections occurs at the proper crankshaft angle(s) in a stable manner.

Maintaining Engine Efficiency and Reducing NOx

In addition to the use of atomized water in the embodiments described above, an embodiment of the present invention is configured to inject a quantity of water into the combustion chamber of an internal combustion engine to maintain an engine temperature of between about 95° C. and about 200° C. This temperature represents the exit temperature of the coolant, i.e. radiator fluid, exiting the engine.

Introducing water into the combustion chamber prior to combustion of the fuel/air mixture can greatly reduce NOx. However, in a conventional internal combustion engine operating at a coolant temperature of about 90° C., as the amount of water introduced increases, the efficiency of the internal combustion engine is decreased. The present invention maintains the efficiency of the internal combustion engine while greatly reducing the generation of NOx emissions by operating the internal combustion engine at a coolant temperature in the range of about 95° C. to about 200° C., and in another embodiment from about 100° C. to about 200° C. and in still another embodiment, from about 100° C. to about 140° C. Thus, in accordance with the present invention, the coolant temperature can be 91° C., 92°

C., 93° C., 94° C., 95° C., 96° C., 97° C., 98° C., 99° C., 100° C., 101° C., 102° C., 103° C., 104° C., 105° C., 106° C., 107° C., 108° C., 109° C., 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., 150° C., 151° C., 152° C., 153° C., 154° C., 155° C., 156° C., 157° C., 158° C., 159° C., 160° C., 161° C., 162° C., 163° C., 164° C., 165° C., 166° C., 167° C., 168° C., 169° C., 170° C., 171° C., 172° C., 173° C., 174° C., 175° C., 176° C., 177° C., 178° C., 179° C., 180° C., 181° C., 182° C., 183° C., 184° C., 185° C., 186° C., 187° C., 188° C., 189° C., 190° C., 191° C., 192° C., 193° C., 194° C., 195° C., 196° C., 197° C., 198° C., 199° C., 200° C.

The breakdown temperature of the lubricants and seals used in the engine limits the high end of the engine temperature. For example, conventional lubricants allow a high end temperature of about 140° C., while synthetic lubricants allow an upper range of at least 200° C. Thus, the present invention may be implemented using engine temperatures greater than 200° C. with the incorporation of lubricants, seals and other engine components capable of properly operating at temperatures greater than 200° C.

For example, in an embodiment the engine shown in FIG. 5 is cooled by internal water injection. The present embodiment includes all the elements shown in FIG. 5. However, in order to provide cooling for the internal combustion engine, the quantity of water injected directly into the combustion chamber 1 is controlled by the engine control computer 30 based on the engine temperature.

The quantity of water injected into the combustion chamber 1 ranges between about 5% water to about 100% water with respect to the quantity of fuel being injected. In an embodiment, the quantity of water may range from about 25% to about 100% with respect to the quantity of fuel, provided the amount of injected water is higher than the volume of water required to saturate air at room temperature.

The actual amount of water injected also depends on the location along the intake track 6. Thus, when the water injection occurs directly into the combustion chamber 1, as shown in FIGS. 5, 6, 8 and 9, moments before the piston 2 reaches top-dead-center, the quantity of water injected may be set at a lower end of the range, i.e., about 5% with respect to the quantity of fuel injected, since the amount of elapsed time between the water injection and combustion is shortened, resulting in less evaporation of the injected water. The longer the length of time that elapses between the moment the water is injected into the combustion chamber 1 and combustion of the fuel at top-dead-center the higher the volume of injected water that will be needed.

Figure 11:
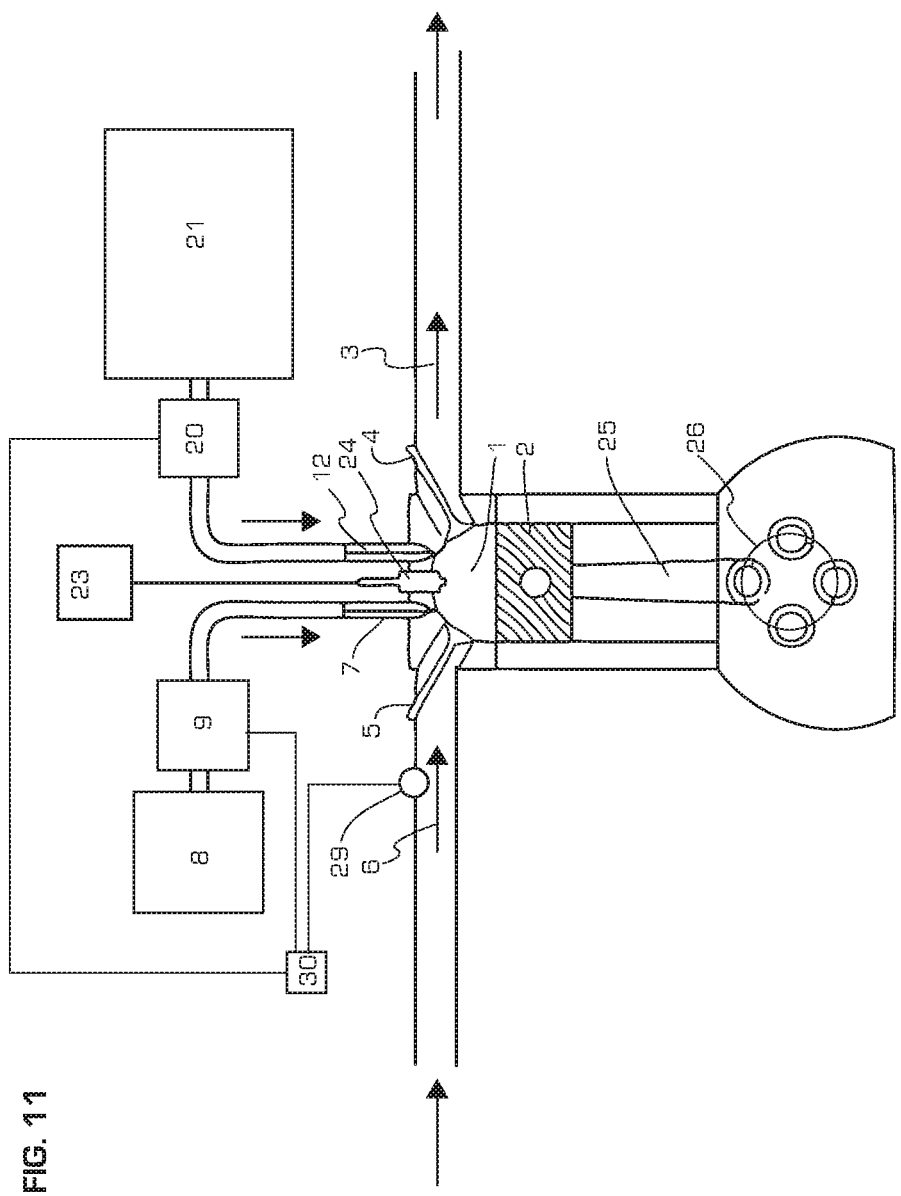
FIG. 11 is a schematic of a naturally aspirated internal combustion engine of the present invention with direct fuel injection with internal cooling via a water injector directly into the combustion chamber.

The present embodiment is described above with respect to internal combustion engines equipped with EGR. However the present embodiment may be implemented in an internal combustion engine without EGR as well, as shown in FIG. 11. As shown in FIG. 11 the implementation is similar to the embodiment shown in FIG. 5. However, the EGR track 11 and supporting components are eliminated in this embodiment. The embodiments shown in FIGS. 6-9 may be similarly modified to forego the EGR component of the present invention and implement the internal cooling aspect of the present invention instead.

Figure 12:
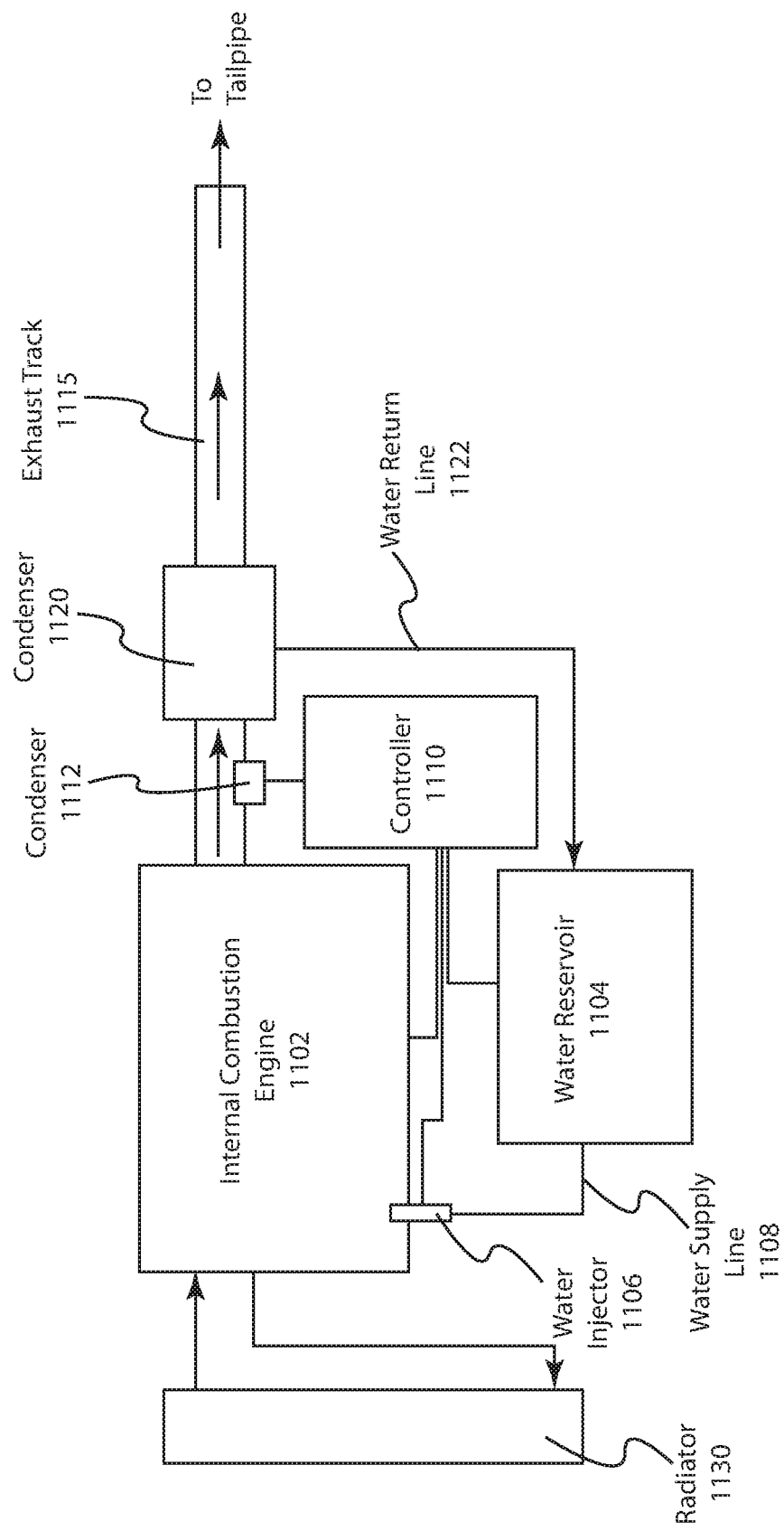
FIG. 12 is a block representation of an internal combustion engine of the present invention with internal cooling and water recovery system.

The system implementing the present embodiment, and shown in FIG. 12, includes an internal combustion engine 1102, a water reservoir 1104, a water injector 1106 arranged to inject water into an intake track or combustion chamber of the internal combustion engine 1102, a fluid line 1108 coupling the water reservoir 1104 and the water injector 1106, and a controller 1110 such as a microcontroller, CPU or FPGA configured to receive operational data, such as exhaust temperature, reservoir water temperature and engine rpm, from sensor probes 1112, and control the amount of water injected into the intake track or combustion chamber of the internal combustion engine 1102. The water reservoir 1104, water injector 1106 and fluid line 1108 form a water injection system.

The water reservoir 1104 is dimensioned to hold a sufficient volume of water for cooling the internal combustion engine 1102 for a determined duration of time in operation or distance traveled. For example, if the quantity of water injected is set to equal the amount of fuel injected, then a vehicle with a 16 gallon fuel tank may be equipped with an equally sized water reservoir 1104, as well; thus allowing sufficient water volume to cool the internal combustion engine 1102 for the full range of travel of the vehicle. Alternatively, a smaller water reservoir 1104 may be provided, which would provide a more limited range of travel, but reduce weight of the vehicle.

In an embodiment, the present invention may be configured to recover water vapor exiting through the exhaust track 1115 by way of a condenser 1120 and water return line 1122 coupled between the exhaust track 115 and the water reservoir 1104. In this embodiment, the range of travel can be extended while still utilizing a small reservoir of only several gallons.

In an embodiment, shown in FIG. 12, the present invention may be configured as the primary cooling system for the internal combustion engine 1102 comprising a water reservoir 1104, water injector 1106 and a condenser 1120. However, a secondary cooling system 1130 implemented as a conventional radiator and coolant reservoir system may be provided as well.

It is understood that the figures show the implementation of embodiments of the present invention with respect to an individual combustion chamber of an internal combustion engine for simplicity. However, in practice the embodiments shown are implemented for each combustion chamber of an internal combustion engine. Thus, while one water injector is shown and described throughout the figures and detailed description, it is understood that in embodiments where the water injector injects water directly into the combustion chamber, at least a number of water injectors equal to the number of combustion chambers is provided.

In embodiments relating to water injection into the intake track, the present invention may be implemented with a single water injector disposed before an intake manifold, which splits the intake into individual intake paths directed to each combustion chamber. Alternatively, if the water injector disposed after the intake manifold, at least one water injector is provided for each combustion chamber and disposed in respective individual intake paths.

The secondary cooling system 1130 provides engine cooling by a flow of coolant, such as a glycol/water mixture, from the radiator through cooling through-passages formed in the internal combustion engine 1102 and returned to the radiator. At the radiator, the coolant is cooled in the conventional manner using airflow generated either by movement of the vehicle or a fan. Thus, the two cooling systems may be configured to function in parallel. Alternatively the secondary cooling system 1130 may be configured to function only once the water reservoir in the primary cooling system has been emptied.

The benefits of the present invention are seen in a large reduction in aerodynamic drag resulting from the elimination of airflow through a radiator. Additionally, as shown in Table 2 below, an internal combustion engine with a slightly elevated engine temperature of about 130° C. allows operation using internal cooling with no net loss of engine efficiency, while also reducing NOx emissions.

EXPERIMENTAL DATA

The effect of internal cooling using water injection and bypassing the external heat exchanger circuit was studied for elevated coolant temperatures. The test engine, operating at a constant 1800 rpm, was modified with a bypass circuit which directs the flow of coolant away from the heat exchanger, i.e. radiator. This is done using a three way bypass valve. The coolant used for this test was formulated without water to avoid boiling at the higher engine coolant temperatures experienced during the testing. Table 2 shows a summary of the results.

It can be seen that when the coolant temperature is maintained at 90° C., which is the coolant temperature set point for conventional internal combustion engines, water injection provided by the present invention greatly reduces NOx, but at a cost of decreased engine efficiency. For example, at 6 bar, NOx was reduced by 91% with the internal cooling temperature stabilized at 90° C. However, the engine efficiency was also reduced by 19%. By modestly increasing the coolant temperature to 130° C., engine efficiency is returned to 36%, while NOx generation experiences only a slight 0.24 g/KWh increase to 1.22 g/KWh. Thus, it can be seen that the increased coolant temperatures offset the adverse effects caused by excessive water injection.

TABLE 2

Comparison of Conventional Cooling and the Present Invention

| Load bar | Cooling Method | Coolant Temp. ° C. | BSFC g/KWh | Efficiency % | NOx g/KWh | EGT ° C. |
|---|---|---|---|---|---|---|
| 3 | Conventional | 90 | 269 | 31 | 10.7 | 291 |
| 3 | Present Invention | 90 | 288 | 23 | 1.13 | 243 |
| 6 | Conventional | 90 | 218 | 36 | 11.7 | 378 |
| 6 | Present Invention | 90 | 246 | 29 | 0.98 | 316 |
| 6 | Conventional | 130 | 225 | 37 | 12.5 | 441 |
| 6 | Present Invention | 130 | 230 | 36 | 1.22 | 385 |

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An internal combustion engine comprising:
  at least one cylinder, each cylinder having a combustion chamber, a piston, an air intake valve, and an exhaust valve, a mechanical compression ratio in each cylinder being greater than 12:1 and less than 40:1;
  an air intake track in communication with each air intake valve;
  an exhaust track in communication with each exhaust valve;
  a fuel handling system with at least one fuel injector for injecting fuel into the combustion chamber or intake track, the fuel handling system providing an air to fuel ratio expressed as a value $\lambda$, said $\lambda$ being greater than 1 and less than 7.0;
  an ignition system for igniting the fuel in the combustion chamber at an end portion of a compression stroke of the piston;
  an exhaust gas recirculating (EGR) system for recirculating exhaust gases from said exhaust track to the air intake track via an EGR track; and
  an apparatus in fluid communication with a water reservoir for spraying a predetermined quantity of atomized liquid water directly into the EGR track for cooling the recirculated exhaust gases by direct contact with the predetermined quantity of atomized water sprayed into the EGR track prior to exhaust gases reaching an intake track or combustion chamber;
  wherein the predetermined quantity of atomized liquid water is in a range of between about 10% to about 125% of the recirculated exhaust gases by weight.

2. The internal combustion engine of claim 1, wherein the predetermined quantity of atomized liquid water is in a range of between about 25% and about 100% with respect to the recirculated exhaust gases by weight.

3. The internal combustion engine of claim 1, wherein the internal combustion engine is maintained at a temperature of about 130° C. during operation.

4. An internal combustion engine comprising:
  at least one cylinder, each cylinder having a combustion chamber, a piston, an air intake valve, and an exhaust valve;
  an air intake track in communication with each air intake valve;
  an exhaust track in communication with each exhaust valve;
  a fuel handling system with at least one fuel injector for injecting fuel into the combustion chamber or intake track;
  an ignition system for igniting the fuel in the combustion chamber at an end portion of a compression stroke of the piston;
  an exhaust gas recirculating (EGR) system for recirculating exhaust gases from said exhaust track to the air intake track via an EGR track; and
  an apparatus in fluid communication with a water reservoir for spraying a predetermined quantity of atomized liquid water directly into the EGR track for cooling the recirculated exhaust gases by direct contact with predetermined quantity of atomized water sprayed into the EGR track prior to exhaust gases reaching an intake track or combustion chamber;
  wherein the quantity of atomized liquid water is in a range of between about 5% and about 100% with respect to the recirculated exhaust gases by weight.

5. The internal combustion engine of claim 4, wherein the quantity of atomized liquid water is in a range of between about 25% and about 100% with respect to the recirculated exhaust gases by weight.

6. The internal combustion engine of claim 4, wherein the internal combustion engine is maintained at a temperature of about 130° C. during operation.

* * * * *